United States Patent Office 3,066,864
Patented Dec. 4, 1962

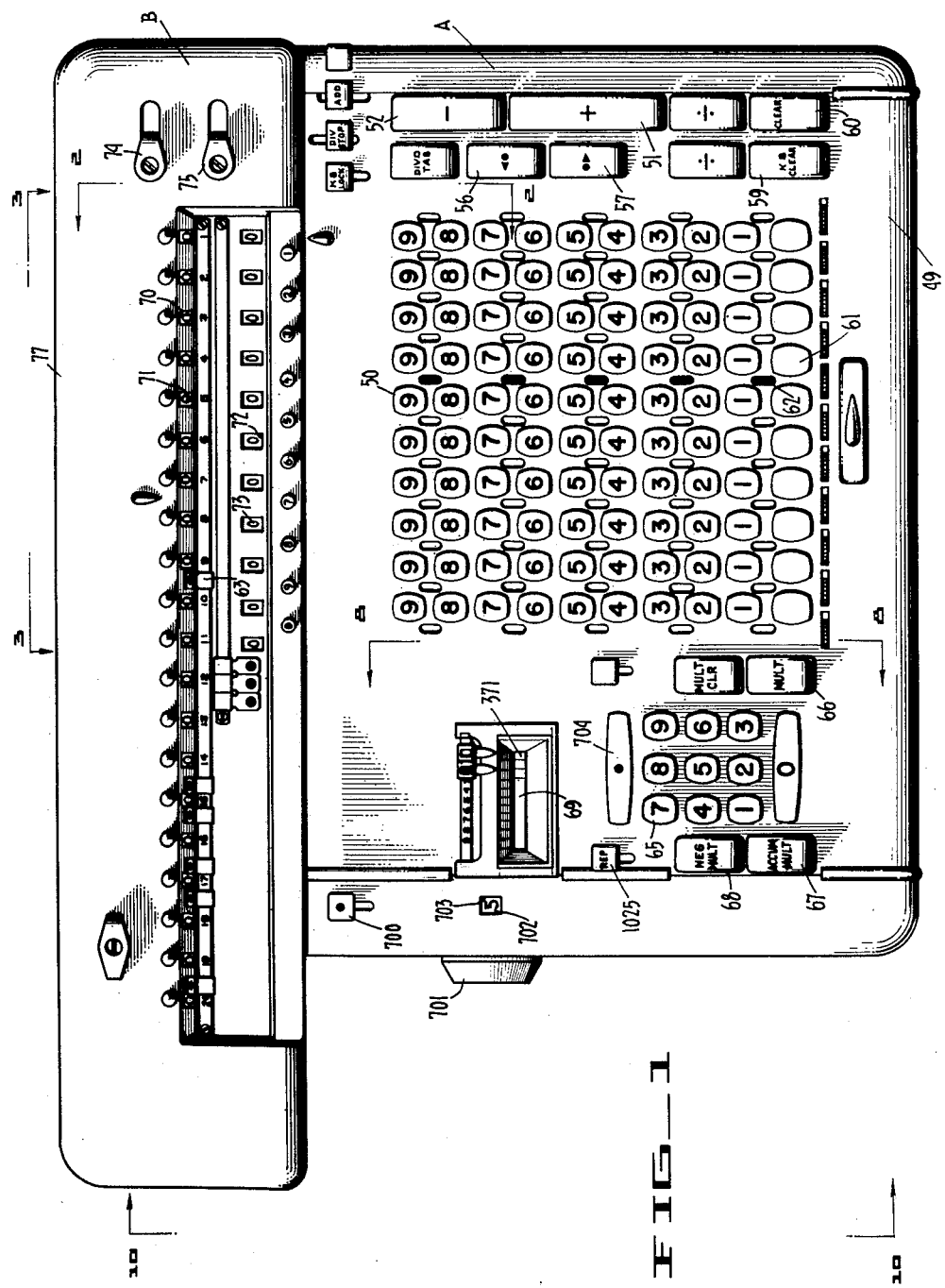
FIG_1

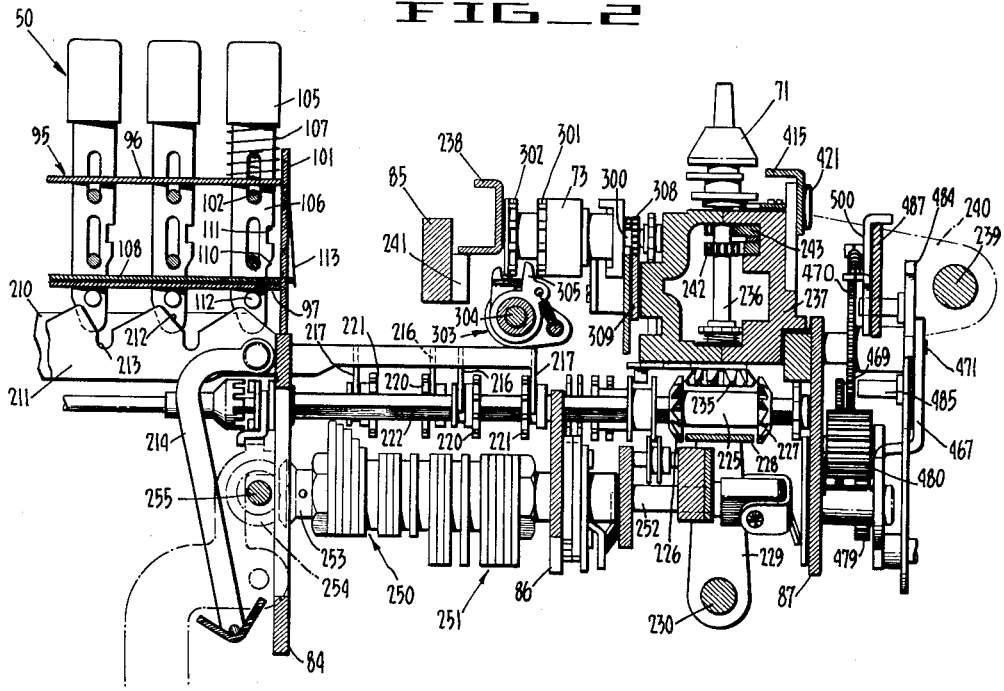

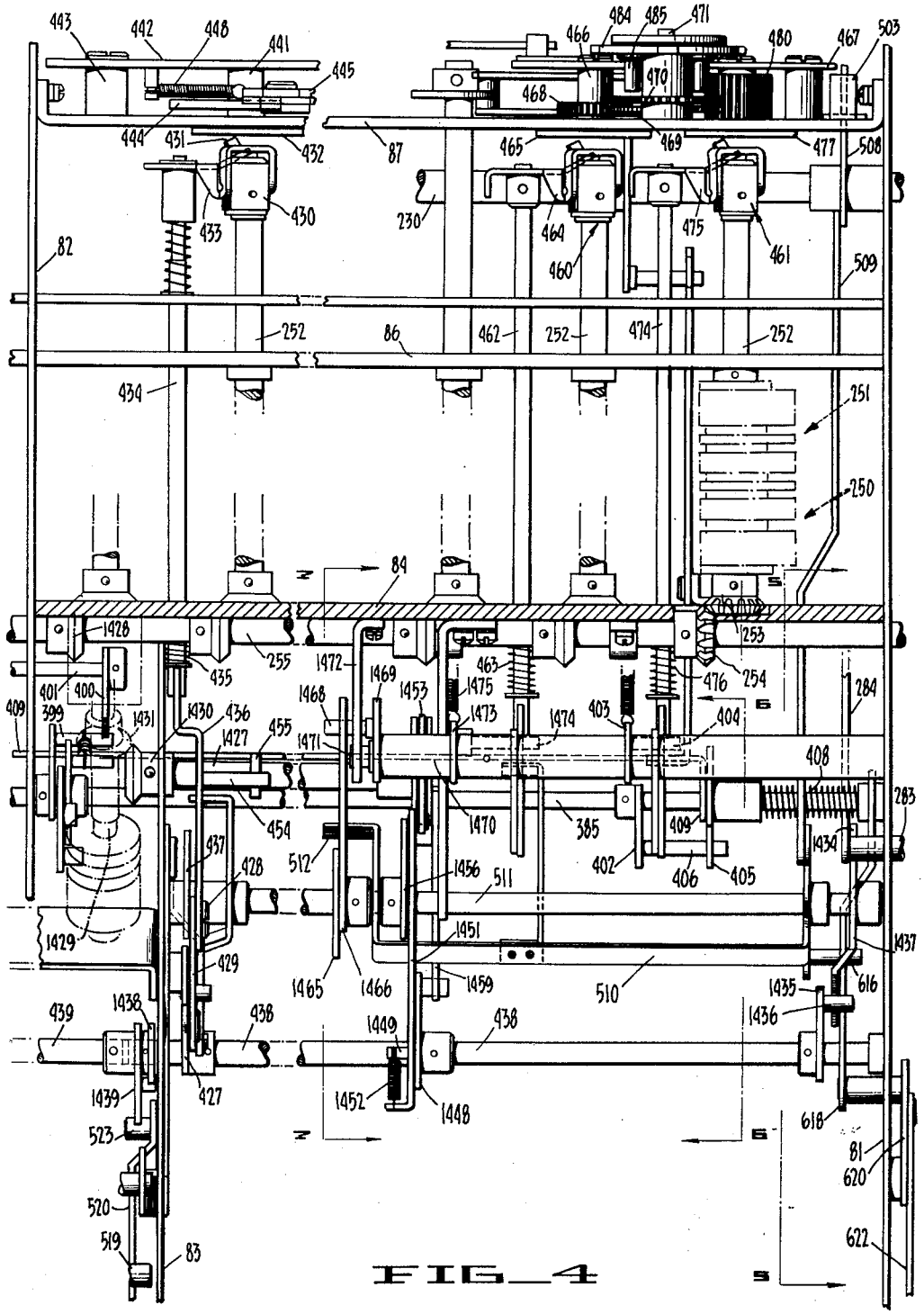
FIG_4

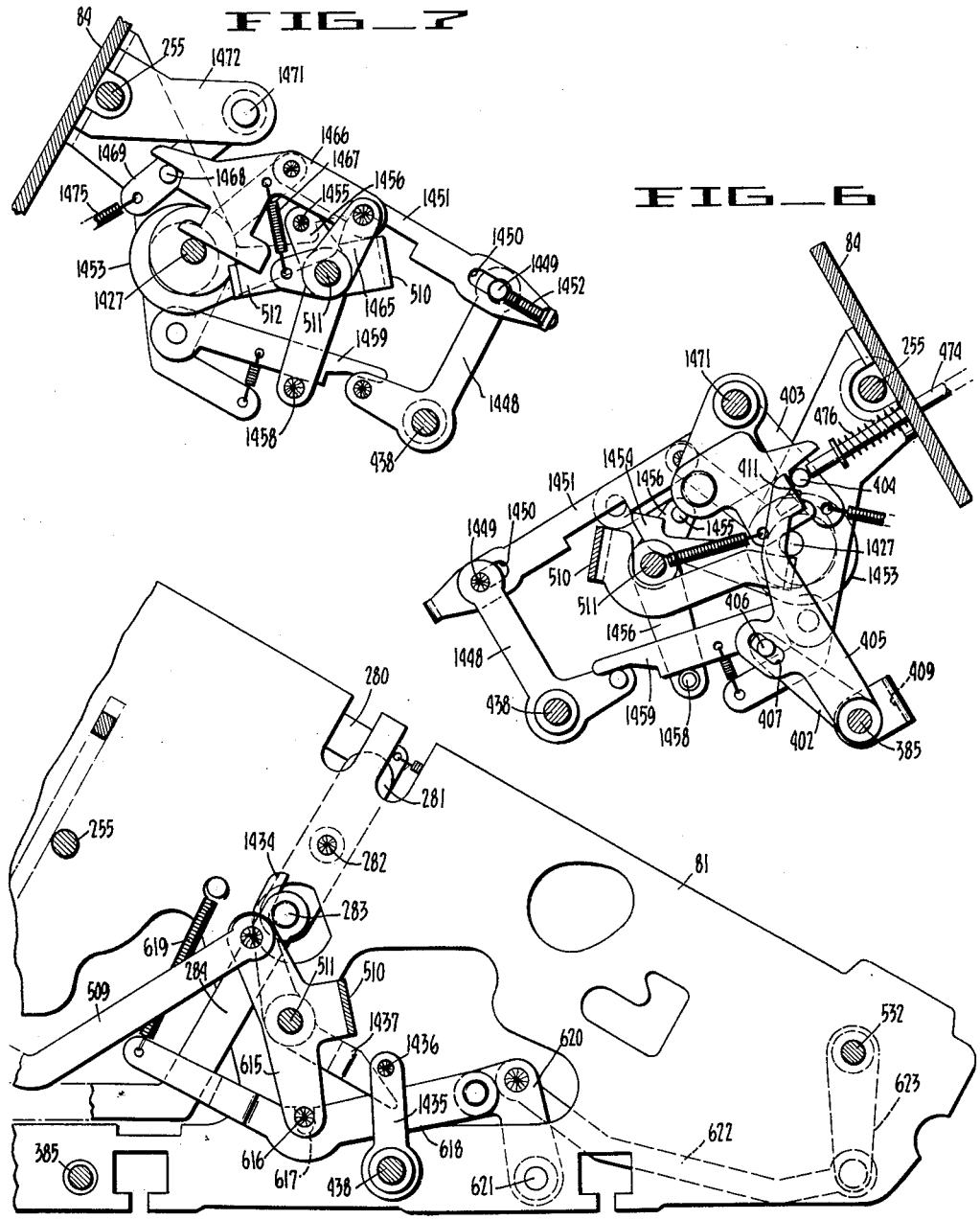

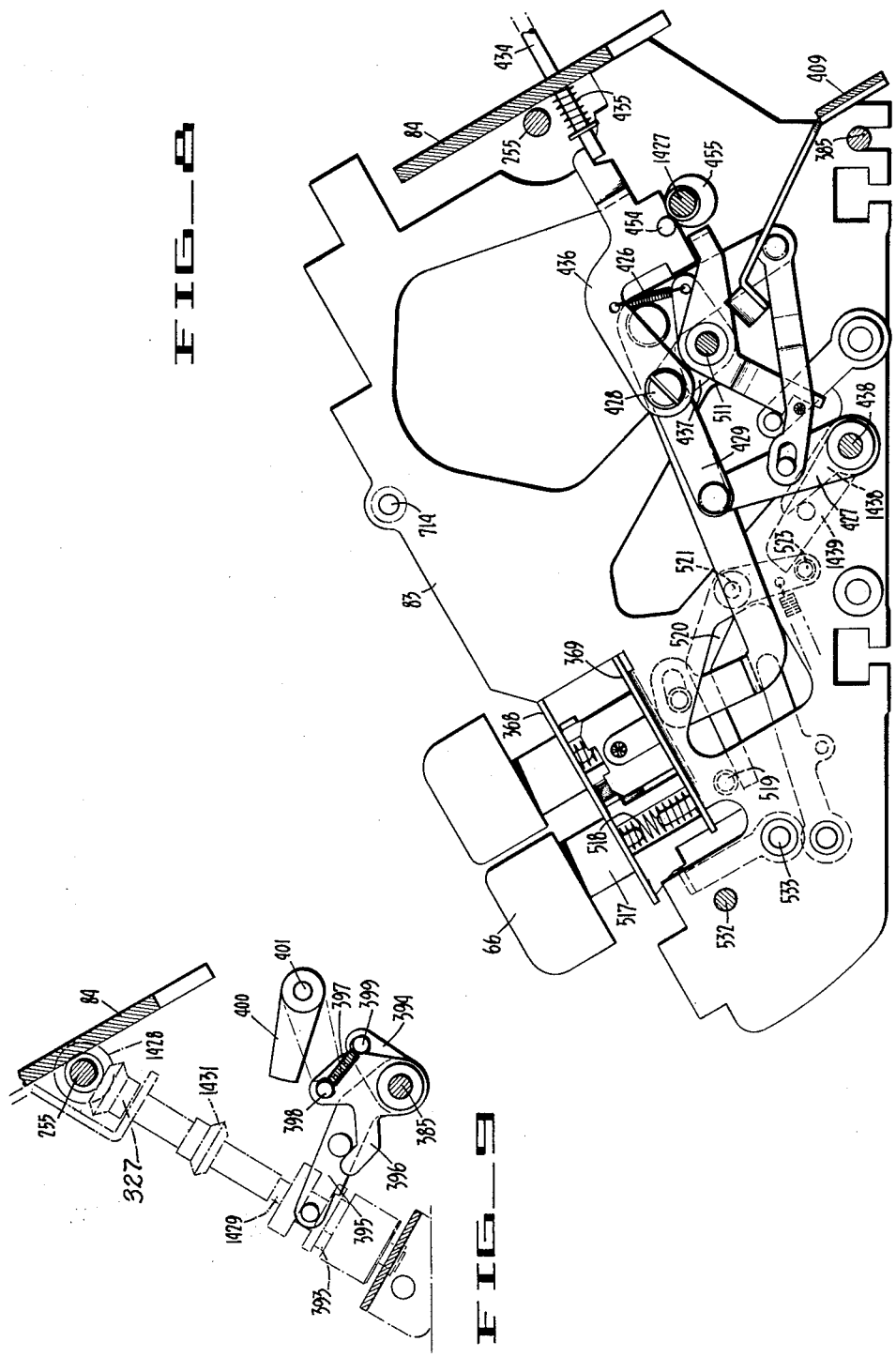

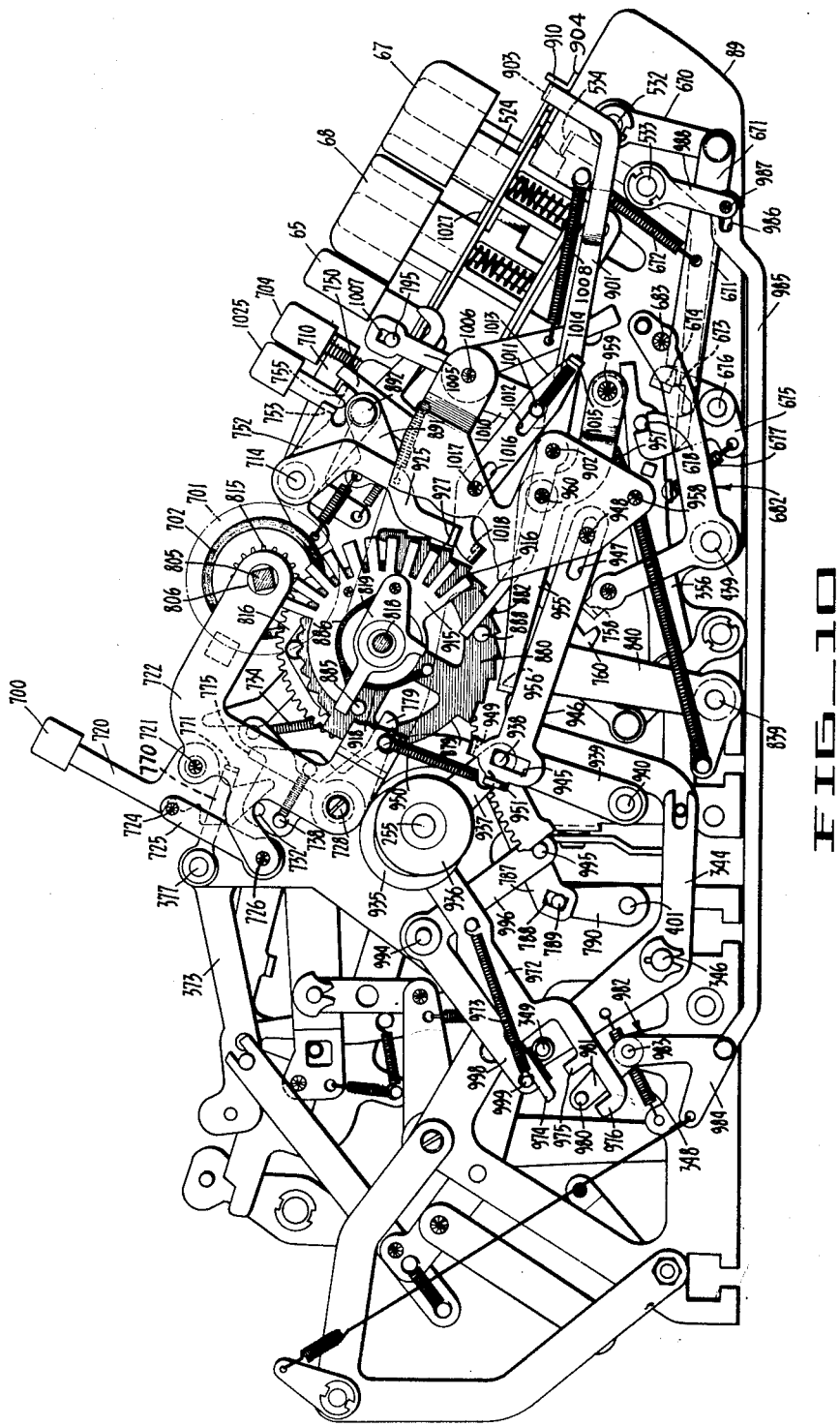

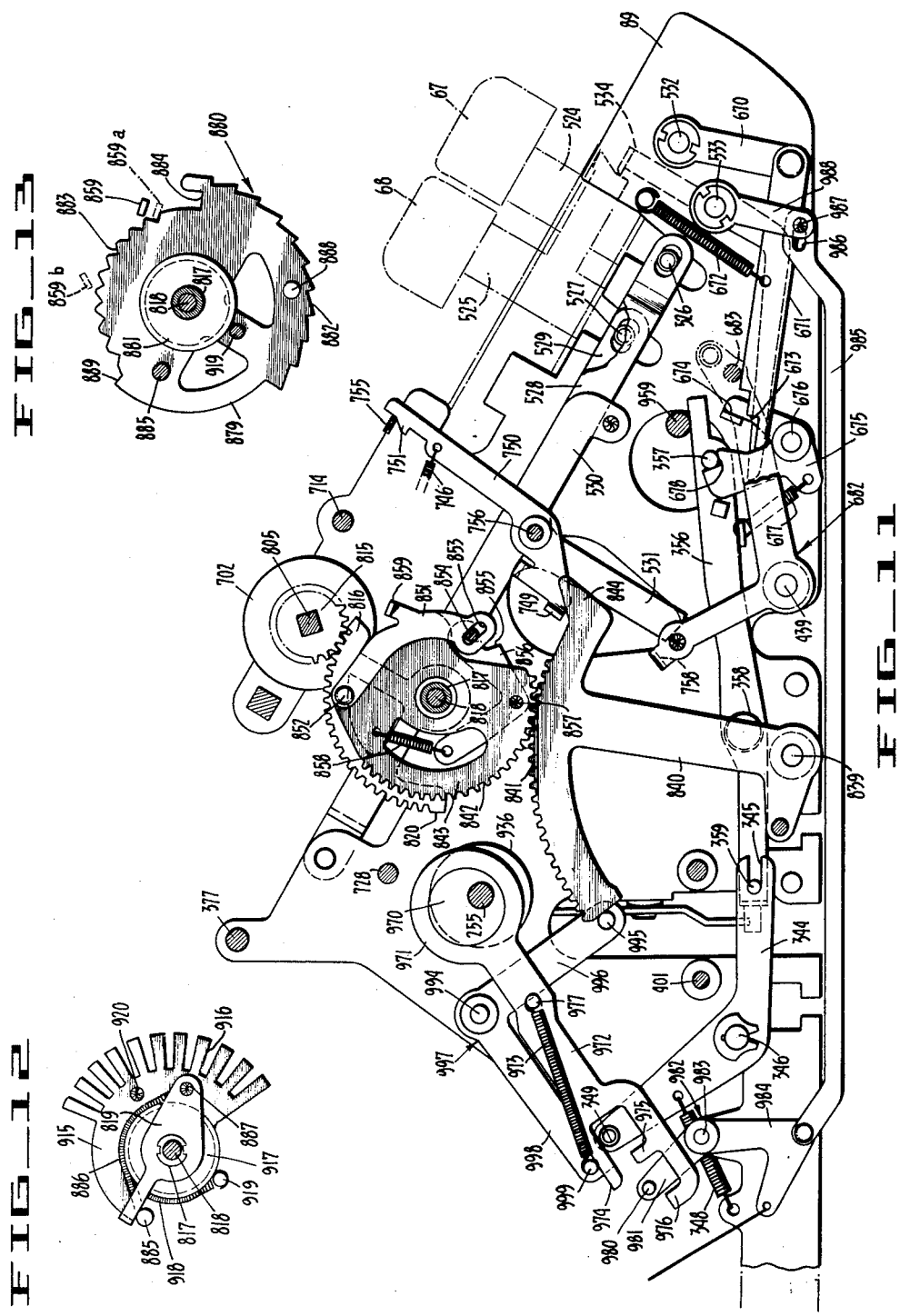

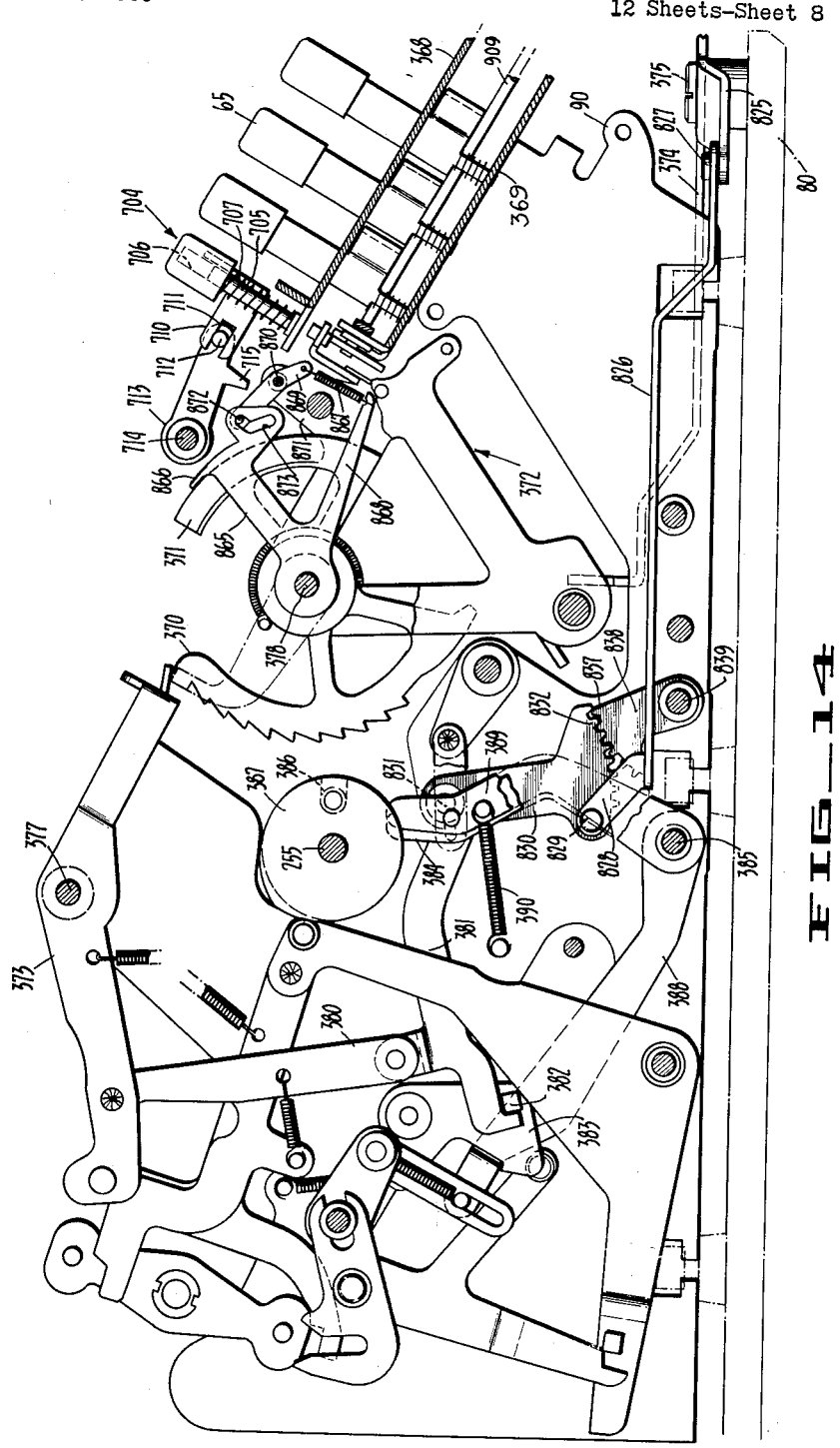

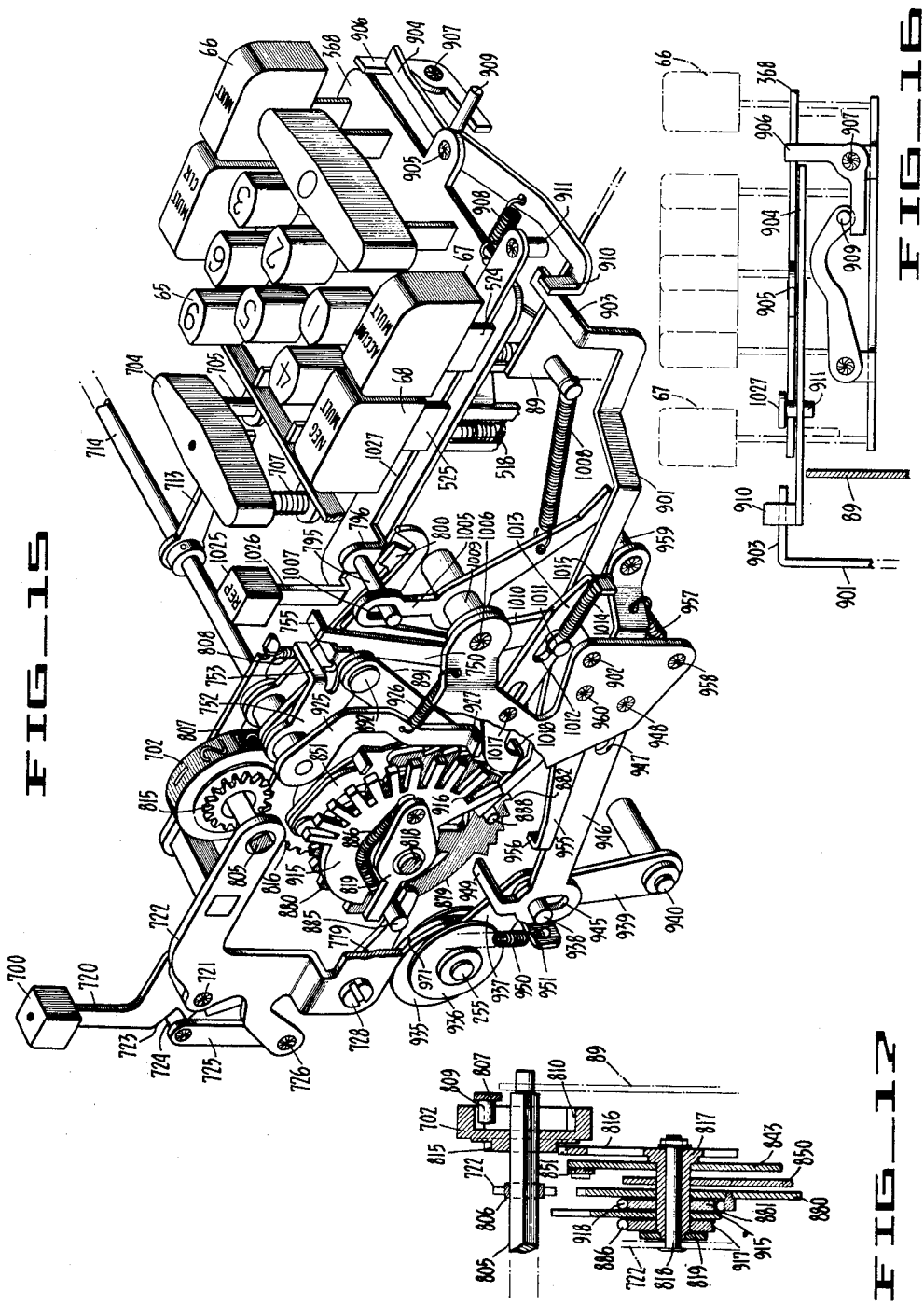

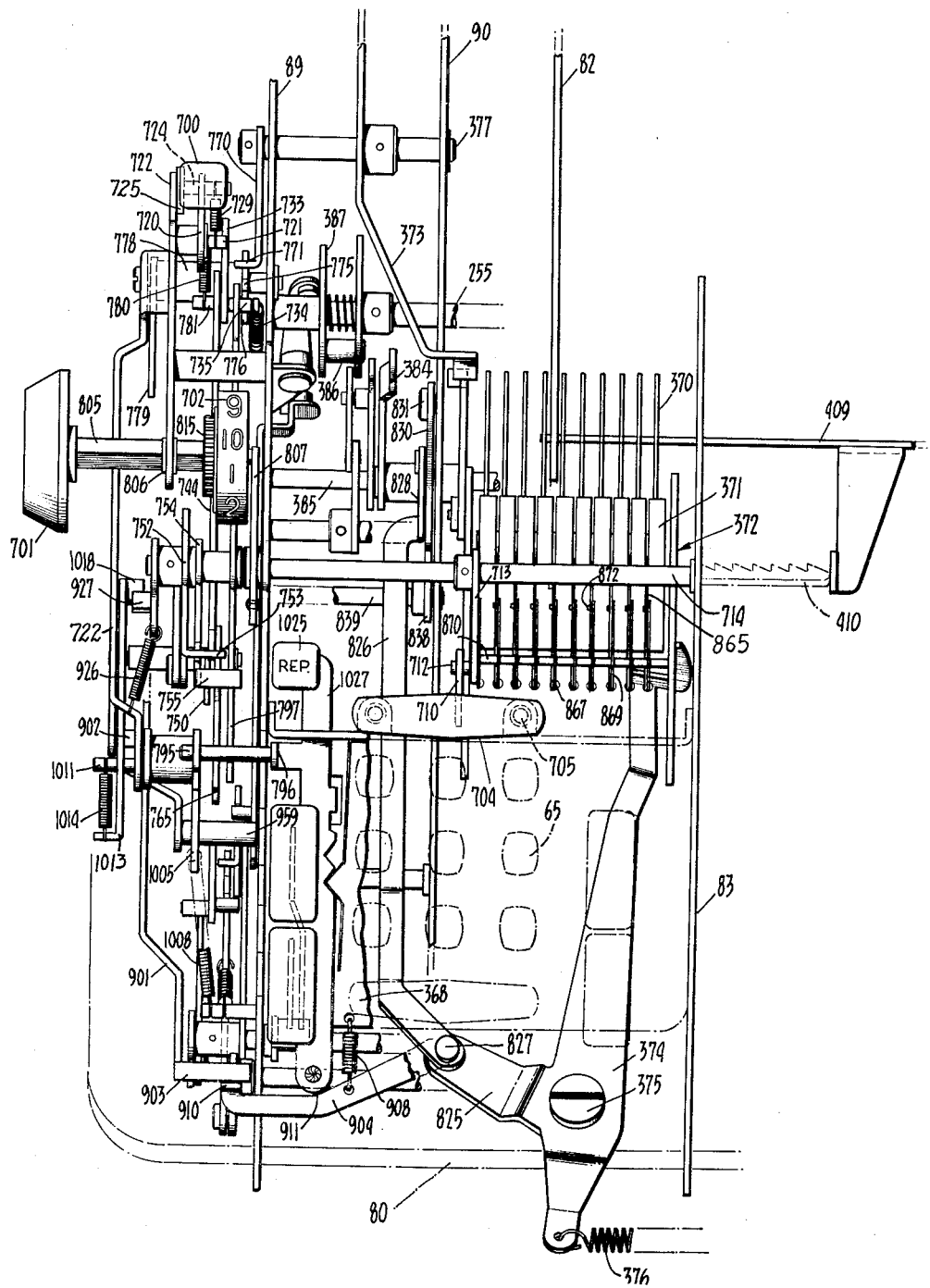

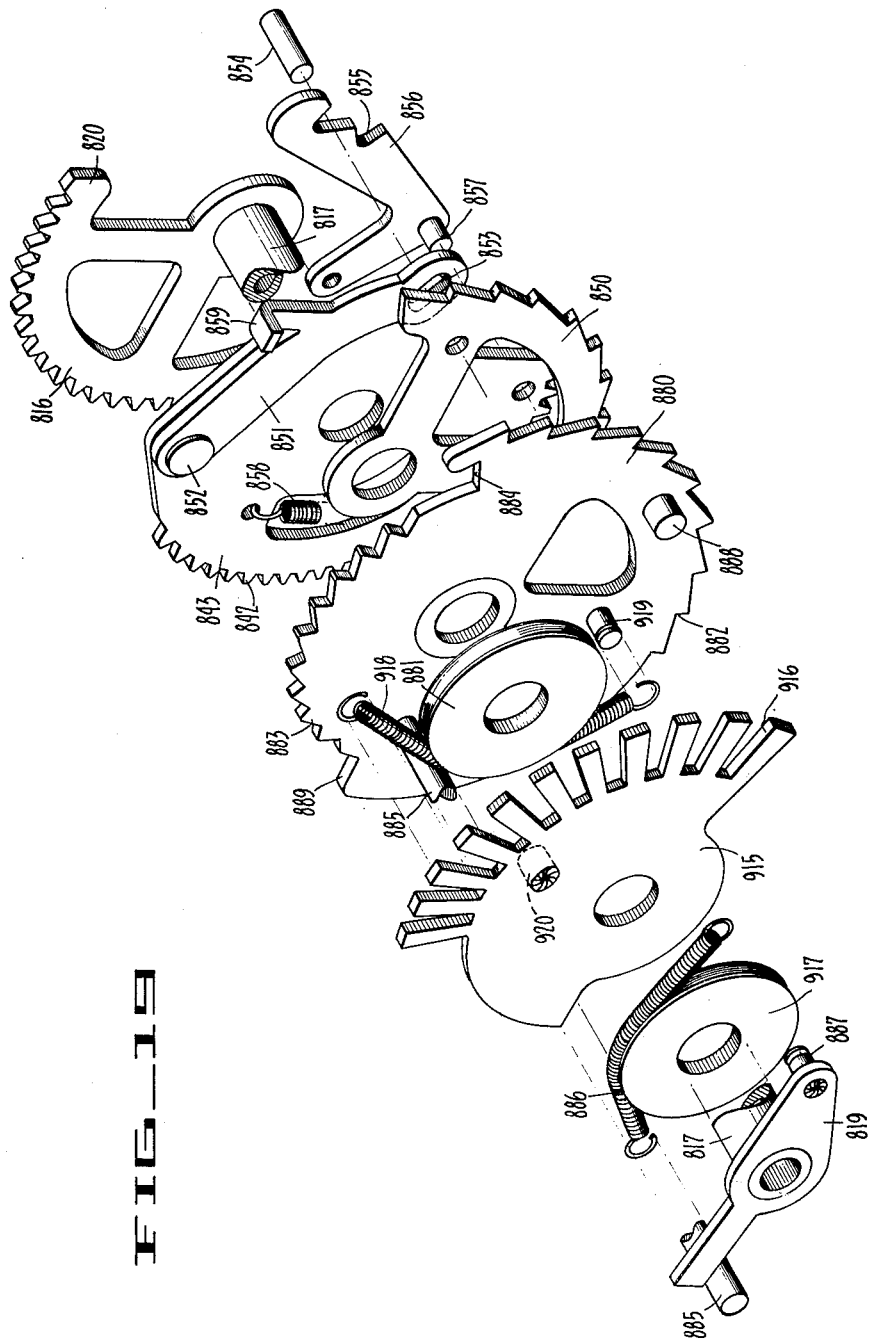

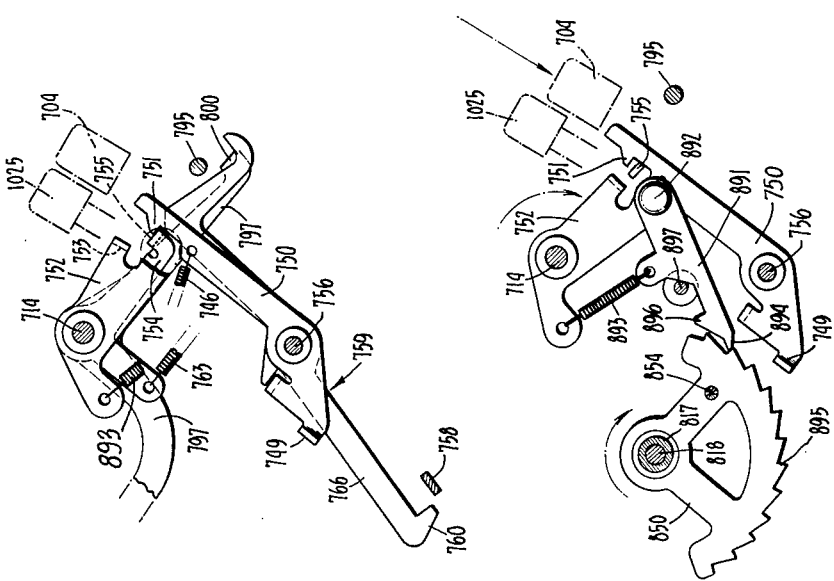

3,066,864
CALCULATING MACHINE
Arthur J. Malavazos, Hayward, and Jan Urdal, Castro Valley, Calif., assignors to Friden, Inc., a corporation of California
Filed Mar. 4, 1960, Ser. No. 12,754
19 Claims. (Cl. 235—63)

INDEX

| | Column |
|---|---|
| I. General Arrangement | 3 |
|   1. Framework | 3 |
|   2. Keyboard | 5 |
|   3. Selection Mechanism | 5 |
|   4. Accumulator Register | 7 |
|   5. Actuating Mechanism | 8 |
|   6. Drive Mechanism | 8 |
|   7. Counter Register | 9 |
|   8. Register Clearing | 10 |
|   9. Carriage Shift | 12 |
|   10. Automatic Carriage Shift | 14 |
|   11. Multiplier Value Storage | 15 |
|   12. Initiation of Multiplication | 16 |
|   13. Multiplication Program Control | 18 |
| II. Automatic Decimal Point Mechanism | 19 |
|   A. Decimal Point Conditioning Key | 21 |
|     (a) Unlock the decimal point key | 21 |
|     (b) Block operation of the multiply initiating keys | 22 |
|     (c) Block double depression of the decimal point key 704 | 23 |
|     (d) Block operation of the multiplication shift control lever 373 | 23 |
|     (e) Disable multiplier carriage shifting mechanism | 24 |
|     (f) Block operation of multiplier repeat key 1025 | 25 |
|   B. Setting Knob | 26 |
|   C. Multiplier Carriage Position Gear | 27 |
|   D. Decimal Point Key | 28 |
|     (a) Set decimal point indicator | 29 |
|     (b) Release shaft 439 for operation by multiplication keys | 30 |
|     (c) Release the repeat key 1025 for operation | 30 |
|     (d) Connect multiplier carriage position gear train with feed rack 850 | 30 |
|   E. Interlock Against Excessive Decimal Digits | 32 |
|   F. Interlock Against Exceeding Capacity of Multiplier Unit | 34 |
|   G. Operation | 35 |
|   H. Restore | 38 |
|   I. Repeat Operation | 39 |

This invention relates to calculating machines and is particularly concerned with an improved mechanism for performing plural order multiplication operations in a manner to accumulate products around a predetermined decimal point in the product register.

It is a particular object of the present invention to provide a calculating machine of the type disclosed in the patents to Friden, Nos. 2,371,752 of March 20, 1945, and 2,399,917 of May 7, 1946, with a decimal point mechanism which is effective to indicate the decimal point in the multiplier value, limit the entry of multiplier digits following the decimal point to a predetermined number and control the multiplication operation in a manner to accumulate the products around a predetermined decimal point.

Another object of the invention is to provide an improved multiplying mechanism for a conventional calculating machine which is operable to perform automatic multiplication operations around a predetermined, or selected, decimal position.

A further object of the invention is to provide an improved calculating machine with means for preselecting the decimal point of a product in the product register, and, as a means to that end, for automatically tabulating the register to a predetermined ordinal, or decimal, position for the registration of such a product.

It is a further object of the present invention to provide what might be called an "automatic decimal" for a multiplication operation, and, in this respect, constitutes an improvement over the patent to Ellerbeck, No. 2,868,453, issued January 13, 1959. In this connection, it can be noted that in the Ellerbeck patent the automatic control of the decimal point in a product is secured by automatically positioning the multiplier carriage of the Friden patents above-noted to a predetermined decimal position by the automatic insertion of the necessary number of "0's" into the multiplier carriage. In contrast to this approach, the present invention secures essentially the same result by automatic control of the product register carriage shifting mechanism. In other words, in our invention, the depression of a decimal point key associated with the multiplier keyboard is effective to set a decimal point indicator in the multiplier check dials, to limit the number of digits to be entered thereafter to the predetermined decimal number, and, when the multiplication operation is initiated, to control a right-hand shifting of the product register carriage (following its return to its home position) to a number of ordinal steps corresponding to the difference between the selected decimal number and the number of multiplier values inserted after the depression of the decimal point key. Thus, the control of our invention is secured through a control of the automatic operation of the product register shifting mechanism as contrasted with an automatic operation of the multiplier carriage escapement mechanism.

These and other objects and advantages will be apparent from the following description of a preferred embodiment of the invention as illustrated in the accompanying drawings in which:

FIG. 1 is a plan view of the preferred form of the machine of the present invention;

FIG. 2 is a longitudinal cross-sectional view of the selection, digitating, and registering mechanisms of the present invention, such as one taken on a plane indicated by the line 2—2 in FIG. 1;

FIG. 3 is a partial rear view of the machine shown in FIG. 1, showing particularly the carriage shifting mechanism of the preferred form of the machine, such as a view taken on a plane indicated by the line 3—3 in FIG. 1;

FIG. 4 is a cross-sectional plan view taken on a plane parallel to the keyboard at a location below the keyboard, and shows particularly the digitation, carriage shifting, and register clearing mechanism of the preferred form of the machine with which the present invention is associated;

FIG. 5 is a detail view of the left side of the right frame plate, showing particularly the mechanism for initiating operation of the machine and for controlling the digitation phase of a multiplication operation, such as a view taken along the longitudinal, vertical plane indicated by the line 5—5 of FIG. 4;

FIG. 6 is a right side view of the automatic shifting mechanism shown in FIG. 4, and is taken along a longitudinal vertical plane such as that indicated by the line 6—6 in FIG. 4;

FIG. 7 is a left-hand view of the mechanism shown in FIG. 6, such as taken along the longitudinal vertical plane indicated by the line 7—7 of FIG. 4;

FIG. 8 is a right-hand view of the mechanism mounted on the left side frame plate, being taken substantially along the longitudinal vertical plane indicated by the line 8—8 in FIG. 1;

FIG. 9 is a detail of the multiplier carriage shifting control mechanism;

FIG. 10 is a left side view of the machine of the present invention, with the cover removed, showing the automatic decimal point mechanism of this invention mounted in place, such as taken along a plane indicated by the line 10—10 in FIG. 1;

FIG. 11 is a left side view similar to FIG. 10 but with certain parts removed to show details of construction;

FIGS. 12 and 13 are details of parts of the automatic decimal point mechanism of the present invention;

FIG. 14 is a left side view taken to the right of the mechanisms shown in FIGS. 10 and 11, and shows primarily some of the details of the construction of the decimal point key and the mechanism for automatically adjusting the decimal point mechanism for operation in accordance with the shifting of the multiplier carriage;

FIG. 15 is a perspective view of the automatic decimal point mechanism of the present invention;

FIG. 16 is a detail of the multiplier keyboard showing details of an interlock associated with the present invention;

FIG. 17 is a cross-sectional view taken from the front of the automatic decimal point mechanism shown in FIG. 15;

FIG. 18 is a plan view of the left side of the machine, showing particularly a plan view of the automatic decimal point mechanism;

FIG. 19 is an exploded perspective view of the automatic decimal point assembly shown in the preceding figures;

FIG. 20 is a detail of some of the control mechanisms associated with the present invention shown in their normal, inoperative position;

FIG. 21 is a detail of part of the mechanism shown in FIG. 20, but with the parts in an operative position; and FIG. 22 is a detail of the means for operating the coupling segment of the automatic decimal point assembly.

I. GENERAL ARRANGEMENT

The invention is described in its preferred form, in which it is shown as adapted to a Thomas-type calculating machine, such as that disclosed in the patent to Friden, No. 2,229,889, issued January 28, 1941, as modified by the incorporation of the multiplier mechanism of Patent No. 2,371,752, issued to Carl M. Friden on March 20, 1945, and the improved multiplier mechanism of Patent No. 2,399,917, issued to Carl M. Friden et al. on May 7, 1946. Also for purposes of illustration, the present invention is shown as incorporated in a machine of the type disclosed in the copending Malavazos application Ser. No. 736,091, filed May 19, 1958, issued as Patent No. 3,045,907 on July 24, 1962. However, the invention is not limited to incorporation in those particular machines as it can be incorporated in, or applied to, other types of calculating machines on the market or suggested in the prior art. It is to be understood, therefore, that the machine shown in the accompanying drawings and described herein exemplifies the preferred form of the invention but that the invention is not limited thereto.

1. *Framework* (*FIGS. 1, 2, 4, 5, 10, 14 and 18*)

It is conventional for calculating machines of the preferred type to comprise a frame, or body portion, A (FIG. 1) upon which is mounted a register carriage B, the latter being ordinally shiftable in either direction with respect to the body portion A. The body portion A is provided with a cover 49 through which project the various keys, such as the multiplicand value keys 50 and the ordinal clearing, or "0", keys 61 which constitute the main keyboard; and the various control keys, such as the plus bar 51, the subtraction key 52, left shift key 56, right shift key 57, a keyboard clear key 59 and a register clearing key 60. The machine used for exemplification of the present invention, as shown in the patents to Friden, Nos. 2,371,752 and 2,399,917, already mentioned, includes an auxiliary, or multiplier, keyboard containing the ten digital value keys 65 arranged as a separate keyboard in the lower, left-hand corner of the machine. Preferably, as shown in these patents, the value keys representing the values of "1" to "9" are arranged in a 3 x 3 square, with a "0" key extending across the front thereof. Preferably values stored in the multiplier mechanism by operation of keys 65 are visible through a window 69, as shown. Adjacent these value keys are the conventional multiplier control keys, such as the "MULT" key 66, which is operative to first clear the registers and then initiate an additive multiplication operation; the "ACCUM MULT" key 67, which controls an additive multiplication without first clearing the keyboard, so that one product can be accumulated with another; and a "NEG MULT" key 68, which is operative to control a subtractive multiplication operation without clearing the registers, so that one product may be subtracted from another.

The cover 77 of the carriage B contains a plurality of ordinally arranged windows 70, through which are visible the accumulator, or product register, dials 71, and another series of ordinally arranged windows 72, through which are visible the counter, or quotient register, dials 73. In the machine with which our invention is preferably associated, the carriage also carries a pair of manually operable clear knobs 74 and 75 for clearing, or zeroizing, the accumulator and counter registers, respectively.

The operating mechanism of the machine is, for the most part, supported upon a main frame which includes a base 80 (FIG. 14), a right side frame 81 (FIGS. 4 and 5), a left side frame 82 (FIGS. 4 and 18), and an auxiliary left side frame plate 83 (FIGS. 4, 8 and 18). The two side frame plates 81 and 82 are interconnected and braced by a plurality of crossbars 84, 85, 86 and 87 (FIGS. 2 and 4) near the rear of the machine. Most of the operating parts are mounted upon this frame, and particularly upon side frames 81 and 82. To the right of the right side frame 81 is an auxiliary, or right side, control plate (not shown), upon which is mounted most of the control keys and their related mechanisms that are mounted on the right side of the machine, i.e., to the right of the main keyboard keys 50. Similarly, on the left-hand side of the machine, and lying to the left of the left frame plate 82 is a left side control plate 89 (FIGS. 10, 11 and 18) and an intermediate plate, or bracket, 90 (FIGS. 14 and 18), lying between the left side frame plate 82 and the control plate 89—upon which plates are mounted most of the control keys and mechanisms relating to the multiplying mechanism.

It should be mentioned that, for the sake of brevity, many mechanisms which are conventional in machines of this kind, such as the division mechanism, the dividend entry mechanism, and the like, which are not pertinent to the mechanisms of the present invention, are not described herein. Those parts which are conventional and which are indirectly related to the operation of this machine will be described as briefly as possible; while those mechanisms which are directly related to the operation of our invention, even though old and conventional, will be described more in detail. It will be understood, therefore, that we assume that our invention will be associated with a fully automatic calculating machine which has conventional features, such as those mentioned, but that for the sake of brevity we will limit our description of conventional elements to those which directly or indirectly relate to the operation of our machine, or those mechanisms which must be modified in their operation in order to provide for the most satisfactory operation of the mechanism of our invention.

2. *Keyboard (FIG. 2)*

The value keys 50 and "0" keys 61 are arranged in longitudinally extending ordinal rows and in transversely extending value banks, as shown in FIG. 1. The keyboard, in the preferred form of the machine shown in FIG. 2, comprises a subassembly in which the keys are mounted in a keyboard frame 95, comprising top and bottom plates 96 and 97, respectively, side frames (not shown), a front plate (also not shown), and a rear plate 101. This keyboard frame is held together as a rigid subassembly by means of interlocking the side and end plates with the top and bottom plates, the assembly being held together by suitable tie rods 102. In our preferred form of keyboard the frame is mounted into the machine by resting the rear plate 101 thereof upon the cross-member 84 and bolting the front portion to the main frame by a suitable tie rod (not shown) to the left auxiliary and right side frame plates, respectively.

The value keys 50 comprise a key top, or button, 105 and a key stem 106. The key stems are slidably supported in aligned slots in the top and bottom frame plates 96 and 97, as by mounting on the tie rods 102 as shown. The key stems are biased to a raised position by suitable springs 107 which surround the upper portion of the key stem and are seated between the top plate 96 and the bottom of the key top 105. A manually operated, or depressed, key stem 106 is latched in its operative position by a conventional latching means, which can comprise a latching slide 108 associated with each order of the keyboard in the conventional machine shown. The latching slides 108 are provided with a plurality of apertures (not shown), through which the coordinal key stems extend, the latching slide being biased to a forward position by a suitable spring, such as leaf spring 113. Each key stem is provided with a rearwardly extending cam nose 110, above which is located a latching notch 111. The depression of a key 50 will cause the cam 110 on the key stem to force the latching slide 108 rearwardly against the bias of its spring, until the key stem has been depressed sufficiently to cause the notch 111 to register with the latching slide, whereupon the latch snaps to its forward position to hold the key stem depressed. Whenever a latching slide is moved rearwardly by the depression of another key in that order, or by operation of any of the keyboard clearing means, the latching slide 108 releases the notch 111, whereupon the key stem is snapped to its raised position by the force of its biasing spring 107.

The lower end of each key stem carries a stud, or pin, 112, which engages a differentially angled cam face 212 of one or the other of a pair of selection, or V-notch, bars 210 and 211, as shown in FIG. 2. It is conventional, in the machine with which our invention is preferably embodied, to provide a pair of selection bars 210 and 211 for each order. Each of these selection bars is supported on a pair of rockable supporting arms 214, only one of which is shown in FIG. 2, and are biased to a rearward, inoperative position by means of a suitable spring (not shown in these figures). It is obvious that the depression of a value key 50 causes the pin 112 on the lower end of its key stem to engage a corresponding cam face 212 and, due to the differential angularity of the respective cam faces 212, to translate the selection bar 210, or 211, forwardly a differential amount. In view of the fact that the depressed key is latched in its operative, or fully depressed, position, the corresponding selection bar 210 or 211 is latched forwardly in its differential position by the engagement of the pin 112 with a latching notch 213 at the lower end of each cam face, which latching notch closely embraces the pin 112.

3. *Selection Mechanism (FIG. 2)*

It has just been mentioned that the lower end of each key stem 106 carries a transversely extending pin 112. This pin is adapted to engage a differentially angled cam face 212 formed in one or the other of the selection, or V-notch, bars 210 or 211. It is conventional in the machine with which our invention is shown, to provide a pair of selection bars 210 or 211 for each order of the keyboard—in the present invention, the former serving the "1" to "4" keys of that order and the latter the "5" to "9" keys. The pair of bars is preferred to a single one in order to avoid the excessive angles on the cam faces 212 which are necessary when these faces represent nine different values. Each of the cam faces 212 terminates in a notch, or pocket, 213, which tightly embraces the corresponding pin 212, when the key is depressed to its locked position, so that the slide 210 or 211 is locked in a differential position by the depression of a key. It is obvious that the depression of a value key (by causing the pin 112 on its key stem to engage the corresponding cam face 212) translates the selection bar 210 or 211 forwardly a differential amount due to the differential angularity of the associated cam faces. The selection bars 210 and 211 differ from those shown in the patents to Friden above-noted, but correspond to those shown in the Malavazos application already mentioned, in that the bars 210 serve the "1" to "4" keys, while the other selection bars 211 serve the "5" to "9" keys, inclusive. The present arrangement also differs from conventional selection bars due to the fact that there is a double increment, or double increase, in angularity between the notches cooperating with the "1" and "2" keys as compared to the others. Thus, there is a double increment of movement of the selection bar 210 between the "1" and the "2" keys as compared to a single increment between all the others, for the purposes explained in the Malavazos application above-mentioned.

The selection bars 210 and 211 extend rearwardly (to the right in FIG. 2) and are provided at their rearward extremities with perpendicularly formed yokes 216 and 217, respectively. These yokes engage in annular slots formed in the collars of a pair of selection gears 220 and 221, respectively, the gears being slidably, but nonrotatably mounted on a longitudinally extending selection, or "square," shaft 222. The square shaft 222 is journalled in the crossframe members, or crossbars, 84, 86, and 87, there being one such square shaft for each order of the keyboard. These selection gears 220 and 221 can be arranged on their square shaft in a conventional manner, but we prefer to arrange them in the same manner as in the application mentioned, as shown in FIG. 2. In the preferred form of construction, the gear 221 (serving keys "5" to "9") of the odd numbered orders of the keyboard is placed toward the rear of the front section of the square shaft, i.e., immediately in front of crossbar 86. This gear is translated forwardly on the square shaft from one to five increments corresponding to the values of "5" to "9," inclusive. The gear 220 is placed forwardly thereof, normally lying in a neutral position, as shown, and translatable forwardly one increment for a value of "1" and then three to five increments for values of "2" to "4," inclusive. In the next higher order, the relative position of the selection gears is reversed, the "1" to "4" gear 220 lying at an intermediate position of the square shaft, while the "5" to "9" gear 221 lies forwardly thereof. All of these gears are moved forwardly differential amounts corresponding to the value of the key depressed, with the exception of the double increment between the "1" to "2" keys heretofore mentioned. Thus, the depression of a value key, by translating one or the other of the selection bars 210 or 211, moves the corresponding selection gear 220 or 221 forwardly on square shaft 222 a differential amount corresponding to the value of the key operated.

The rear end of the square shaft 222 carries a digitation control spool 225 (FIG. 2) slidably but nonrotatably mounted thereon. The forward end of the spool carries an addition gear 226 and the rear end carries a subtraction gear 227, the spool and the two gears forming an integral assembly. The two gears 226 and 227 are adapted to register with the ordinally related accumulator gear 235 when the spool 225 is displaced from its central, or neutral, position shown. The spools 225 are moved in unison to either operative position by means of a gate 228 extending transversely across the machine and lying between the two integral gears 226 and 227. The gate 228 is preferably mounted on a pair of similar arms 229, only one being shown herein, which are rigidly secured to a digitation control shaft 230. Normally, the assembly comprising the shaft 230 and gate 228 is held in the intermediate, or neutral, position shown by means of a centralizer, conventional in the art but not shown herein. However, various controls, some of which will be mentioned hereafter, are effective to rock the shaft 230 and consequently displace the digitation control spools 225 forwardly or rearwardly as the operation demands, thereby operatively connecting the accumulator gears 235 to either the plus gears 226 or to the minus gears 227. The differential rotation of a square shaft 222 caused by the differential rotation of its selection gears 220 or 221 resulting from their differential positions axially of the shaft, thus drives the accumulator gear 235 incremental amounts in either sign character direction.

4. Accumulator Register (FIG. 2)

An accumulator register containing a series of ordinally arranged dials 71 is mounted in the shiftable carriage B. In the machine shown in FIG. 1, the register contains twenty such dials 71 for a selection mechanism of ten orders. The various assemblies in the register comprise a dial 71 and the accumulator gear 235, both of which are mounted upon a common dial shaft 236. Preferably the dial shaft is journalled in a hollow frame bar 237 which forms one of the major frame members of the carriage B. The differential rotation of the square shaft 222 caused by the longitudinal translation of the selection gears 220 or 221 and the rotation of the corresponding actuators 250 or 251 is, upon rocking of the gate 228 from the neutral position shown, effective to rotate the dial 71 additively, or subtractively.

It can be mentioned at this point that the carriage frame B comprises, in addition to the hollow frame bar 237, a front carriage rail 238 and a rear carriage bar 239, which also extends longitudinally of the carriage, or transversely of the machine. These three members, the front rail 238, the hollow frame bar 237 and the rear bar 239, are tied together into a rigid carriage by means of similar end pieces 240, only one of which is being shown herein. The carriage is laterally shiftable, the front rail riding upon rollers 241 mounted on the crossbar 85, and the rear bar 239 sliding in bearings (not shown) carried by the frame plates 81 and 82.

It can also be mentioned at this point that the register dials 71 can be returned to a "0" position by any suitable clearing, or xeroizing, mechanism, that shown in this embodiment being the one normally found in the machines of this type, as illustrated by Patent No. 2,229,889 above-mentioned. This mechanism comprises a mutilated gear 242 mounted on each accumulator dial shaft 236. All of these mutilated gears can be engaged by a clearing rack 243 of conventional construction. The longitudinal movement of the rack engages the mutilated gears and returns the dial assemblies to their "0" position, as is well-known in the art. The means for operating the clearing racks 243 will be described under the heading of "Register Clearing." It can also be mentioned at this point that there is a tens-transfer mechanism between the various orders of the register, but as this mechanism has no relation to the present invention, it will not be described—reference being made to the above-mentioned patent to Friden, No. 2,229,889, for a detailed description of this mechanism.

5. Actuating Mechanism (FIG. 2)

The actuating mechanism of the machine shown is of the well-known Thomas-type, modified slightly as to tooth arrangement as described in the Malavazos application above-mentioned. This type of actuating mechanism comprises a number of stepped drums 250 and 251 arranged transversely of the machine. These drums are mounted on parallel shafts 252, parallel to the square, or selection gear, shafts 222. It is conventional in the Friden machine which is used to exemplify this invention, to provide one actuator shaft 252 for each pair of square shafts 222, and to mount two drums 250 and 251 on each of these shafts 252—one set of the drums to serve the order to the right of the actuator shaft 252 and the other to serve the order to the left. These actuator drums are provided with differentially stepped teeth, so that forward translation of either of the selection gears 220 or 221 causes the gear to lie in the path of travel of a number of teeth on the associated actuator drum corresponding to the value key 50 depressed. It is conventional in the mechine of the Friden patents above-mentioned to use two identical drums on each drive shaft 252 and to divide each drum so that one portion will serve the "1" to "5" teeth and the other the "6" to "9" teeth, and conventionally both drums are provided with the "1" to "5" selection on the forward part of the drum. In the present invention, it is preferred to modify these drums so that one will serve the "1" to "4" keys with a blank space between the one-tooth segment and the two-tooth segments, as is clearly shown (FIG. 2) on the rearward section of drum 250 or the forward section of the drum 251, the other segments lying closely adjacent to each other, as is conventional. This construction is desirable in a back transfer operation described in that application, but is immaterial in the present invention. However, as the present invention is preferably incorporated in a back transfer machine of the type shown in that application, this feature is mentioned in passing.

The actuator shafts 252 are driven by a miter gear 253 rigidly mounted on the forward end of each shaft, each of which gears meshes with a corresponding miter gear 254 on the main drive shaft 255, as is best shown in FIG. 4. The main drive shaft 255 is given a complete cycle of rotation with each machine cycle, thereby rotating the actuators 250 and 251 a complete revolution in each machine cycle and consequently giving the selection gears 220 or 221 and square shafts 222 increments of rotation depending upon the longitudinal position of the selection gears on their respective square shafts.

It can be mentioned that it is conventional in a machine of this kind to provide a Geneva stop for each square shaft 222 so angularly disposed on the square shaft as to positively stop rotation thereof at the termination of the digitation phase of a cycle of operation. It is also customary in these machines to start the ordinal digitation operation of the values differentially, in an inverse order, and to stop digitation of all values in an order simultaneously. Thus, a single Geneva wheel and Geneva block will provide a positive stopping action of the square shafts 222, and consequently the register dial 71, at the end of each digitation phase. As these blocks are not pertinent to the present invention, they will not be further described.

6. Drive Mechanism (FIG. 5)

Various mechanisms of the machine, including the main drive shaft 255 and the actuator shafts 252 just mentioned, are given cycles of operation as required by means of a conventional electric motor (not shown) which rotates the drive shaft 255 by means of a conventional clutch (also not shown). The construction of the clutch, its operation, and the closing of the power switch to the motor, are so well known that it is believed a full description thereof is unnecessary. Consequently, reference is made to the motor and clutch mechanisms of the Friden patents and the Malavazos application abovementioned for disclosures of this portion of the machine. However, it can be noted that a conventional clutch pawl is operated by a link 280 (FIG. 5), the rear end of which is pivotally connected to the upper end of the clutch pawl. The forward end of the link is pivotally mounted on the upper end of a two-armed lever 281 which is pivotally mounted on a right-hand frame plate 81 by any suitable means, such as stud 282. A long pin 283 is riveted on, or otherwise rigidly secured to, the lower end of the lever 281 and extends through an aperture in the frame plate in order to support the forward end of a long, rearwardly extending, switch control link 284. By this construction, the clutch pawl (not shown) and the switch control link 284 are operated in unison to simultaneously engage the clutch and close the power switch to the motor. It can also be noted at this point, that the simultaneous operation of the clutch and motor is secured by forward translation of the pin 283 which pulls the switch link 284 forwardly to close the motor switch and rocks the clutch lever 281 (counter-clockwise in this figure) to cause operation of the clutch pawl to effect an engagement of the driver and driven parts of the clutch.

7. Counter Register (FIG. 2)

The carriage B also contains a counter, or quotient register, comprising the dials 73. As shown in FIG. 1, it is conventional to provide a series of ordinally arranged counter dials 73 containing a number of dials approximately half that of the accumulator register—in the machine shown in FIG. 1, eleven such counter dials are utilized as compared to twenty accumulator dials 71. This number of counter dials is selected to provide one more than the orders of the selection and actuating mechanisms, and one more than the ordinal positions of the carriage B, so as to provide an overflow dial in the event that ten or more cycles of operation are performed with the carriage in its extreme righthand position. The counter dials 73 are rigidly mounted on ordinally arranged, longitudinally extending shafts 300, as shown in FIG. 2. The rear ends of these shafts 300 are journalled in bearings in the carriage frame member 237 and the forward ends are journalled in bearings formed in the front carriage rail 238. Each counter dial assembly also includes a feed gear 301 and an integral tens-transfer control plate 302 formed as a spool and rigidly mounted on the shaft 300; and a conventional mutilated clearing gear 308. The clearing gears are engaged by a clearing rack 309, which may be of the conventional type disclosed in the Friden patents previously mentioned, so that longitudinal translation of the rack returns all of the counter dials to "0." A counter actuator 303 is mounted on a shaft 304, which shaft is given an oscillatory, or rocking, motion in a plane perpendicular to the axis of the shaft 304 and also a longitudinal translation parallel to the axis of the shaft, with each cycle of operation. Thus, in each cycle of operation, a counting finger 305 of the actuator 303 of the lowest, or units, order of the actuating mechanism will mesh with the ordinally aligned gear 301 and then be translated in one direction or the other to give the gear a single increment of motion and thus enter a value, or count, of "1" into the dial 73 aligned with the units order of the actuating mechanism. The operation of the counter actuator and its ability to effect the necessary tens-transfers has been described in the patent to Friden, No. 2,229,889, and hence no further description of its action is deemed necessary in the present disclosure.

It can be mentioned here that it is conventional, at least in the machine with which the present invention is preferably associated, to provide means for operating the counter additively or subtractively, and also to control that setting to a sign character to be either identical with, or opposite to, the sign character of registrations in the accumulator register dial 71. As such a mechanism is not pertinent to the present invention, it is not believed necessary to describe it.

8. Register Clearing (FIGS. 2, 3, 4 and 8)

The accumulator register dials 71 may be cleared, or returned to their "0" registration positions, by a conventional clearing means which is best shown in FIG. 2 and which comprises a mutilated clearing gear 242 on each dial shaft 236. In order to conserve space and make the ordinal spacing as small as possible, these gears are alternately arranged on the respective shafts. Associated with the mutilated gear 242 is a double clearing rack 243 which extends longitudinally of a carriage frame and is slidable therein. The rack can be operated by means of a clearing knob 74 (see FIG. 1) or by power through operation of a power-operated clearing bar 415 (best shown in FIG. 3), the construction and operation of which will be shortly described. Similarly, the counter dial 73 may be zeroized, or cleared, by a conventional clearing means shown in FIG. 2 and which comprises the mutilated gear 308 rigidly mounted on each of the dial shafts 300. Associated with the mutilated gears 308 is a clearing rack 309 which extends longitudinally in the carriage. These clearing gears are likewise alternately arranged on their respective shafts, and a double rack is provided to operate them. This rack can be operated by means of a clearing knob 75 (FIG. 1) which is attached to the rack or by power through the clearing bar 415 mentioned in the preceding paragraph.

It is well-known that, in the machine utilized herein for purposes of exemplification, the clearing bar 415 may be selectively connectable to the clearing knobs 74 and 75, as is illustrated in the patent to Friden, No. 2,294,083. Thus, the rightward movement of the clearing bar 415 (to the left in FIG. 3) is normally effective to move the knob 74, and hence the clearing rack 243, to the right to clear the register dial 71. Similarly, if the controls are set to connect the counter clearing knob 75 to the clearing bar 415, the operation of the latter will also move the knob 75 to the right and hence clear the counter register dials, i.e., return them to a "0" registration.

The clearing bar 415 is adapted to be driven to the right (to the left in FIG. 3) by a power mechanism which is shown particularly in FIGS. 3 and 4. It should be noted that the bar 415 is mounted on the carriage frame bar 237 (see FIG. 2) by suitable pin-and-slot connections comprising pins 421 on the rear side of the frame bar engaging slots 422 in the clearing bar 415. The clearing bar 415 is resiliently biased to the left (to the right in FIG. 3) by any suitable means, such as a spring (not shown) tensioned between one of the pins 421 and a corresponding stud on the clearing bar.

In the preferred form of clearing mechanism utilized in the machine with which our invention is associated, the left actuator shaft 252 (see FIG. 4) is extended to a plane adjacent the rear frame crossbar 87 and carries at its rear end a conventional driving clutch member 430. This clutch member carries a driving tongue 431 pivotally mounted thereon, which, when rocked rearwardly, engages a notch in a driven plate 432. The position of the driving tongue 431 is controlled by a conventional control bracket 433 mounted on the rear end of a clutch control bar 434. The control bar, or pusher rod, 434 is slidably mounted in cross plates 84 and 86 and is resiliently biased toward the front of the machine by a suitable compression spring 435 compressed between the crossbar 84 and a collar on the control rod as shown. The control rod can be moved rearwardly against the force of its spring 435 by a pusher link 436, thereby rocking the driver tongue 431 into engagement with the notch in the driven plate 432 to place the clutch in an engaged, or driving, condition. The rear end of the pusher link 436 is provided with a shoulder (shown in FIG. 8) that engages the front end of the clutch control bar 434. The front end of the pusher link is pivotally mounted on an arm 437 that is rotatably mounted on a shaft 511. The movement of the pusher 436 is controlled by a link 429 that is pivotally connected to the pusher 436 by a screw stud 428, which also interconnects the arm 437 and pusher 436. The front end of the link 429 is pivotally connected to an arm 427 that is rigidly mounted on initiating shaft 438. Thus, the rocking of the shaft 438 (which, in the instant invention, is occasioned by a depression of any of the multiplier initiating keys 66, 67 or 68), through its rocking of arm 427 and the translation of link 429 and pusher 436, moves the clutch control rod 434 to its clutch-engaging position.

It should be noted that in our invention the shaft 438 is split (as shown in FIG. 4), so that the right end 438 of the shaft can be rocked by other control keys without rocking the left end. On the other hand, the rocking of the left end of the shaft 439 will be effective to rock the right-hand end 438. Thus, when the shaft 438 is rocked by other control keys not here pertinent, it will not affect the multiplication operation. On the other hand, when the shaft 439 is rocked by any of the multiplier control keys, it will rock the shaft 438 to initiate the rightward shifting operation. This construction comprises an arm 1439 on the right end of shaft 439, which arm carries a pin that overlies and abuts against an arm 1438 on the left end of shaft 438 (see FIGS. 4 and 8).

It can be noted at this point that the clearing, or resetting, operation is limited to the first machine cycle, even though the shaft 438 is held in a rocked position throughout a program, or series of operations. This is readily accomplished by means of a cam arrangement (shown particularly in FIG. 8). The pusher link 436 carries a rightwardly extending pin 454, the pin normally lying forward of a shaft 1427. However, when the pusher link 436 is moved rearwardly to cause engagement of the clearing clutch, the pin 454 will overlie the shaft 1427. The shaft 1427, as shown in FIGS. 4 and 9, is geared to a vertically extending shaft 1429 by means of miter gears 1430 and 1431, and the shaft 1429 is geared to the main drive shaft by means of miter gears 327 and 1428, whereby the shaft 1427 rotates synchronously with the main drive shaft 255. The shaft 1427, as shown in both FIGS. 4 and 8, carries an eccentric cam 455, which, at approximately the halfway point of a cycle of operation, engages the pin 454 whenever the pusher rod 436 has been moved rearwardly to push the shift control rod 434 to its operative, or clutch-engaging, position. Upon such engagement of the pin by the cam, the pusher link is lifted from engagement with the clutch control rod 434, whereupon the latter is snapped forwardly by its compression spring 435. Thereafter, the cam releases the pin and permits the pusher link to drop under the force of its spring 426 toward its rod-engaging position. However, the rod will have moved forwardly in the interim, so that the lower edge of the link will ride upon the top of the rod, and thus the rearward position of the pusher link will have no effect on the clear clutch or its control rod. The clutch control rod is, therefore, positively disengaged at approximately the midway point of a clearing cycle and cannot become re-engaged until the shaft 438 is rocked backwardly to its original position to enable the shoulder on the pusher link to engage the forward end of the clutch control bar 434. By this means, in any programmed operation, the clear clutch may be operated once, but only once during the program.

The driven clutch disk 432 (FIG. 4) is mounted on the forward end of a shaft 441 which is journalled in the rear cross-bar 87 and a supporting bracket 442 which is mounted on the crossbar by suitable spacing studs 443. This shaft 441 carries a clearing cam 444 (see FIG. 3) pinned on, or otherwise rigidly secured to, the shaft intermediate the cross plate and the bracket. Cooperating with the cam is a follower arm 445 which, in this instance, is formed as a bellcrank pivoted on a pivot stud 446 extending between the crossbar 87 and the bracket 442. This follower arm 445 is provided with a follower roller 447 which engages the periphery of the clearing cam 444, the arm and roller being biased into engagement with the cam by any suitable means, such as spring 448. The actuator shafts 252 of a Thomas-type machine conventionally rotate in a clockwise direction when viewed from the rear, as in FIG. 3, for in this type of machine the main drive shaft 255 rotates in one direction only. It follows that the shaft 441 and clear cam 444 are likewise rotated (in a clockwise direction in FIG. 3), and that the shape of the cam provides a gradual rise from the full-cycle position shown in this figure to about the 270° position with an almost instantaneous drop in the final portion of the cycle. Thus, the follower arm 445 is pushed to the right (to the left in FIG. 3) for three-fourths of the cycle of operation and then is released to be snapped back to its full-cycle position by the spring 448.

The upper end of the follower arm 445 is pivotally connected to a rightwardly extending link 449 (leftwardly in FIG. 3, which is a rear view), which link is provided with an elongated slot 450 shaped as shown in FIG. 3. This slot embraces a pin 451 mounted on the rear cross plate 87. It is obvious that the rocking movement of the follower arm 445 (to the left in FIG. 3) moves the link 449 in the same direction—the movement of the link being first in a diagonal direction to lift the right end of the link in the first portion of movement and then to give a linear translation to the right. The upper end of the link is provided with an ear 452 adapted to engage one of the ordinally spaced shoulders 453 on the lower edge of the clearing bar 415, so that the ear 452 can engage the clearing bar in any ordinal position of the carriage B and hence clear the registers in any ordinal position.

9. Carriage Shift (FIGS. 2, 3 and 4)

It has previously been mentioned that the carriage is shiftable in either direction with respect to the frame, or body, A of the machine. The carriage is shiftable by powder under the control of the manually operated keys 56 or 57 (FIG. 1), and also in certain automatic operations, one of which will be explained hereafter. The mechanism for shifting the carriage is shown particularly in FIGS. 2, 3 and 4, and is essentially that shown and described in the patent to Carl M. Friden et al., No. 2,380,642, issued on July 31, 1945, as modified by the clutch mechanism shown in the patent to Matthew, No. 2,679,916, issued on June 1, 1954.

The movement of the carriage is controlled by a left shift clutch 460 and a right shift clutch 461 (see FIG. 4) of conventional construction, which preferably are mounted on the two rightmost actuator shafts 252. In the machine shown in this embodiment, it is conventional for these actuator shafts to be driven with each cycle of operation, so that they rotate in every cycle of every machine operation, but the shifting mechanism is normally disengaged from the actuator shafts.

The operation of the left shift clutch 460 from its normally inoperative to its operative position is controlled by movement of a shift rod 462, resiliently urged toward the front of the machine by a suitable compression spring 463 seated between the crossframe 84 and a collar on the front end of the rod. The rear end of the shift clutch control rod 462 is provided with a clutch control member 464 which positions a tongue carried by the driving member in its operative, or in its inoperative, position, depending upon the position of the control rod 462. Cooperating with the clutch member 460 is a driven member 465 having a notch in which the tongue of a driven member 460 may be engaged. This disk is mounted on a shaft 466 journalled in the rear frame plate 87 and a bracket 467 attached thereto by suitable spacing studs as shown. This shaft carries a gear 468 which meshes with the larger gear of a compound gear assembly 469 (FIG. 3), the smaller section of the compound gear meshing with a shift gear 470 which is rigidly pinned to, or otherwise mounted on, a shift shaft 471.

Similarly, the right shift clutch 461 is under the control of a right shift rod 474, this rod carrying a clutch control member 475 similar to that on the left shift rod, and similarly biased toward the front of the machine by a compression spring 476. The rearward movement of the rod and control member 475 rocks the tongue of the clutch member 461 into engagement with a notch in a clutch disk, or driven member, 477. This member is mounted on a shaft 478 (FIG. 3), likewise journalled on the crossplate 87 and the bracket 467, which shaft carries a gear 479 located on the rear end of the shaft adjacent the bracket 467. This gear meshes with a wide idler 480 (see FIG. 4) which also is in mesh with the large gear of the compound gear 469.

The rearward movement of the clutch control rod 462 or 474 operates the shift clutch 460 or 461, respectively, to connect an actuator shaft 252 to the shifting mechanism, which includes the driven plates and gear trains just mentioned. It is obvious that the operation of either of the rods 462 or 474 will selectively drive the shift gear 470 in opposite directions, depending upon which clutch is operated. The shaft 471, upon which the shift gear 470 is rigidly mounted, also carries a shift plate 484 which is provided with four equally spaced pins 485. These pins are adapted to engage in notches 486 of a conventional shift rack 487 mounted on the rear side of the carriage frame bar 237. In this manner, the rearward movement of the left shift rod 462 causes the carriage B to be shifted to the left, while movement of the right shift rod 474 causes the carriage to be shifted to the right.

The left shift rod 462 and right shift rod 474 can be operated from the shift keys 56 and 57, respectively, by conventional mechanisms which are not pertinent to this invention and which, therefore, will not be described. In addition, the left shift control rod 462 will be operated by the automatic shifting mechanism described in the following section, and the right shift control rod will be operated at the end of each ordinal series of a multiplying operation, as described in section 13 dealing with multiplication program control.

The terminal notch 486 on the right end of the shift rack 487 (at the left side of FIG. 3) is formed by an override pawl 500 pivoted on the rack by any suitable means, such as by stud 501. The pawl is resiliently biased into alignment with the notches by any suitable spring (not identified), which is conventional in this type of mechanism, in which position a notch formed in the left end of the pawl constitutes the terminal notch on the right end of the rack. The lower edge of the pawl is provided with a cam face adapted to be engaged by one of the rotating pins 485 when the drive plate 484 attempts to move the carriage to the left beyond its extreme lefthand position, thereby rocking the override pawl on its pivot 501 (counter-clockwise when viewed from the rear as in FIG. 3). The outer, or right-hand, end of the pawl 500 is formed as a nose 502, which, in the extreme left-hand position of the carriage, overlies an ear 503 of a vertical slide 504 mounted on the rear side of the crossplate 87 by suitable pin-and-slot connection, such as constituted by screws 505 threaded into the crossplate 87 and which are embraced by slots 506 in the slide. The slide 504 is resiliently biased to its upward position by a suitable means, such as a spring (not shown). The lower end of the slide overlies a horizontal arm of a bellcrank 508 (see also FIG. 4) which is pivotally mounted on any suitable means, such as the digitation control shaft 230. The vertical arm of the bellcrank is connected to a forwardly extending link 509, as is shown in FIG. 4, which link is connected at its forward end to the upstanding arm of a transverse bail 510. The bail 510 is pivotally mounted on a transverse shaft 511 (FIG. 5) and its left leg 512 extends rearwardly and upwardly to engage a pusher link operated by the automatic clearing and shifting mechanism in order to disable the same when the carriage B reaches the extreme left-hand position in an automatic shifting operation.

10. *Automatic Carriage Shift* (FIGS. 4, 5, 6 and 7)

In the Friden calculating machine with which the present invention is preferably associated, multiplication is always initiated with the carriage in an extreme left-hand position. In some operations, the carriage is automatically cleared, while in others, such as negative multiplication or accumulative multiplication, the register is not cleared. Each multiplication operation causes rocking of shaft 439, 438, so that normally the mechanism described in section 8 is operated during the first cycle of machine operation. This clearing mechanism, however, can be disabled by means not here pertinent but shown in the Friden patents, Nos. 2,371,752 and 2,399,917. However, in every multiplication operation, the carriage is shifted to the extreme left-hand position starting in the second cycle of operation, i.e., immediately following the clearing operation just mentioned. The mechanism for so shifting the carriage is described in detail in the patent to Machado, No. 2,650,761. In view of that patent it is believed that a complete and detailed description of this mechanism is not necessary, but it will be very briefly mentioned because it is preferred to use it in connection with multiplication controlled by the present invention.

This mechanism is operated by the rocking of the shaft 438. This shaft, and its coaxial extension 439, extends entirely across the machine, its right end being journalled in the right-hand frame plate 81 (FIG. 4) and its left end in the left side control plate 89 (FIG. 11, where it is shown as the divided left end 439). Adjacent its right end (preferably immediately to the left of the right-hand control plate 81, as shown in FIGS. 4 and 5), the shaft 438 carries an arm 1435 pinned on, or otherwise rigidly secured thereto. This arm carries a roller stud 1436 which engages the forwardly extended arm of a lever 1437 rotatably mounted on any suitable means, such as shaft 511 already mentioned. The rearwardly extended arm of this lever terminates in a hook 1434 which lies behind the pin 283 that connects the switch control link 284 to the clutch lever 281 already described. Hence, the rocking of the shaft 438 (counterclockwise in FIG. 5), through the rocking of levers 1435 and 1437, causes the engagement of the clutch and the closing of the motor switch, and thus initiates machine operation. The shaft 438 is held in a rocked condition by the control keys which control the rocking of this shaft until the operation is completed, so that the machine will continue to cycle until the termination of the operation, which, in this case, is multiplication.

At an intermediate location, the shaft 438 carries an L-shaped lever 1448 (FIGS. 4, 6 and 7) which is pinned to, or otherwise rigidly mounted on, the shaft. The upper end of the vertical arm of this lever carries a pin 1449 engaging a slot 1450 in a link 1451. A spring 1452 holds the link and arm in the retracted position shown in FIGS. 6 and 7. The rear end of the link 1451 is connected to one leg of an eccentrically mounted bellcrank 1453 which is mounted on an eccentric carried by the shaft 1427 which rotates synchronously with the main drive shaft 255. The other arm of this bellcrank is shaped as a hook member 1454 adapted to engage a pin 1455 mounted on the upper end of an arm 1456. The lever 1456 is pinned on, or otherwise rigidly secured to, the shaft 511. When the eccentric bellcrank has been rotated (clockwise in FIG. 6) by the rocking of shaft 438 and the translation of link 1451, it will, at the extremity of its throw, engage pin 1455 and thereby rock lever 1456 and shaft 511 (clockwise in FIG. 6 or counter-clockwise in FIG. 7). It will be understood that the eccentric 1453 rotates constantly as the shaft 1427 rotates synchronously with the drive shaft 255 to which it is geared. However, in the normal position shown in FIG. 6, the hook does not engage the pin 1455, so that such operation of the eccentric is an idle one. However, as soon as the eccentric is rocked by its link 1451, the hook 1454 will engage the pin 1455 at the outer extremity of its path and will thereafter rock the arm 1456 (clockwise in FIG. 6) to an operative position. When rocked to its extreme position, a pin 1458 on the lower end of lever 1456 engages the latching shoulder of a latch arm 1459, thereby latching the arm 1456 and shaft 511 in the operative position. It can be noted now that at this point the bellcrank 1448 has been rocked (clockwise in FIG. 6) to enable the latching of the arm 1456, and that the latch is disabled when the shaft 438 and the lever 1448 pinned thereon are returned to their original position shown in this figure.

The shaft 511 (as shown in FIGS. 4 and 7) also carries an arm 1465 rigidly mounted thereon, which arm supports the forward end of a pusher link 1466. A spring 1467, tensioned between an extension of arm 1465 and the link, biases the shaft 511 to its inoperative position and the pusher link 1466 to its lower position. The rear end of the pusher link 1466 has a shoulder adapted to engage a pin 1468 carried by an arm 1469 which is formed on the left end of a sleeve 1470 (see FIG. 4). The sleeve 1470 is mounted on a shaft 1471 journalled in a bracket 1472 mounted on the crossbar 84 and the right frame plate 81. The right end of the sleeve 1470 (as shown in FIG. 4) terminates to the left of the left shift clutch control rod 462. At its right end the sleeve carries an arm 1473, on the end of which is a long, rightwardly extending pin 1474 that engages the front end of the control rod 462. Thus, the rocking of shaft 511, by the engagement of the eccentric hook 1453 with the pin on arm 1456, rocks the sleeve 1470 to push the left shift control rod 462 rearwardly and thereby engage the left shift clutch.

The pusher link 1466, which controls this automatic left shift operation, overlies the rearwardly extending left leg 512 of the override bail 510, as shown in FIGS. 4 and 7. Hence, the operation of the override pawl and its connected mechanism, and the consequent rocking of bail 510, when the carriage reaches its extreme left-hand position, is effective to lift the pusher link 1466 so that the shoulder no longer engages the pin 1468. Thereupon the pusher rod spring 463 snaps that rod forwardly to an inoperative position, and a spring 1475 tensioned between the lower end of the arm 1469 and the framing of the machine (not shown), snaps that arm to its normal inoperative position, whereupon the lower edge of the pusher link 1466 rides upon the pin 1468 and has no further control of a left shifting operation.

In connection with the register clearing mechanism already described, it was mentioned that the clearing clutch was under the control of the control rod 434, and that this rod was moved rearwardly by a link 436 which was connected to an arm 427 (FIG. 8) pinned to the shaft 438. Hence, the rocking of the shaft 438 from the depression of one of the multiply initiating keys is effective to initiate the clearing operation in the first cycle of machine operation, during which cycle the eccentric hook 1453 rocks arm 1456 and shaft 511 to condition the left shift clutch 469 for operation—which shifting operation, however, cannot begin until the beginning of the next cycle because of conventional interlocks, not shown.

11. *Multiplier Value Storage (FIGS. 1, 14 and 18)*

As is well-known, and as particularly shown and described in the patents to Friden, Nos. 2,371,752 and 2,399,917, multiplier values are entered into a multiplier storage mechanism through sequential depression of the multiplier value keys 65. The multiplier value keys are mounted for substantial vertical movement in multiplier keyboard frame plates 368 and 369 (FIG. 8) mounted between the frame plates 83 and 89 (FIG. 18). Depression of any of the value keys 65, through mechanism not here pertinent, but which is described in the two Friden patents just mentioned, is effective to position a series of multiplier segments 370 differentially from the "0" position shown in FIG. 14 to a value position determined by the key operated. Preferably these segments are mounted on a common shaft 378 constituting a part of the multiplier carriage 372, and are resiliently biased to an extreme value position (counter-clockwise in FIG. 14). Rather than go into a lengthy description of the mechanism interconnecting the various keys 65 and the effective order of the multiplier segments 370, it is believed sufficient to refer to the Friden patents just mentioned. It can be noted, however, that each of the segments preferably carries a dial 371, carrying the multiplier values thereon which are visible through window 69, so that they may operate as check dials to enable the operator to verify the multiplier value entered into the mechanism. Also, the depression of any one of the keys 65 is effective to operate an escapement mechanism by means of which the multiplier carriage 372, which carries the ordinally arranged segments 370, is stepped one ordinal space to the left. It should be mentioned that the return of the operative one of the multiplier segments 370 to its "0" position shown in FIG. 14 is effective to rock a two-armed lever 373 to the counter-clockwise position shown in this figure, from the position to which its forward (right) end drops at the start of operation in any order. Such rocking of the lever 373 is effective to initiate the interordinal program which controls the shifting of the carriage B and multiplier carriage 372 in such operations, which will be described more fully in section 12 below.

The multiplier carriage 372 is strongly biased to the left by the mechanism best shown in FIG. 18. This mechanism comprises a three-armed lever 374 pivotally mounted at the juncture of its arms upon the base plate 80 by any suitable means, such as a screw stud 375. It has one arm bearing against the right-hand frame plate of the multiplier carriage 372. A strong spring 376 tensioned between the opposed end of the lever 374 and the right side frame plate strongly biases the lever to shift the carriage to the left (rocking the lever 374 counter-clockwise in FIG. 18). This lever, in our invention, is formed with a third arm 825 which is used to establish a representation of the multiplier carriage position, as will hereinafter be described in connection with our decimal point mechanism.

12. *Initiation of Multiplication (FIGS. 5, 8 and 11)*

It should be noted that the shaft 439, 438 is rocked by the depression of any of the multiplier initiating keys 66, 67 and 68. The means for so rocking the shaft 438, from the depression of the "MULT" key 66, is shown in FIG. 8. This key is mounted on a key stem 517 slidably supported in aligned slots in the multiplier keyboard frame plates 368 and 369 and resiliently biased to a raised position by a compression spring 518. The lower end of the key stem 517 carries a roller 519 which overlies the forward end of a bellcrank lever 520. This lever is pivoted on the right side of the auxiliary left side frame plate 83 by any suitable means, such as stud 521. The lower arm of the bellcrank 520 carries a roller stud 523. This roller stud, as shown in FIG. 8, engages the forward edge of the arm 1439, which arm, it will be recalled, is pinned to, or otherwise rigidly secured on, the end of shaft 439. Hence, the depression of key 66 is effective to rock the formed arm 520 (counter-clockwise in FIG. 8), thereby rocking arm 1438 and consequently shaft 439 (in a clockwise direction in this figure and counter-clockwise in FIG. 5). The rocking of arm 1439 from the engagement of its pin with the forward edge of arm 1438, thus rocks arm 1438 and shaft 438.

The shaft 439 is rocked by depression of the "ACCUM MULT" key 67 and the "NEG MULT" key 68, as is shown in FIG. 11. Each of these keys is on a key stem 524 or 525, respectively, mounted for substantial vertical movement in the multiplier keyboard frame (best shown in FIG. 15) and are biased to a raised position by suitable springs, such as spring 518 shown in connection with key 66. Each of the keys 67 and 68 carries a roller stud 526 or 527, respectively, on its lower end. These roller studs are engaged in slots formed in the respective ends of an accumulate multiply initiating lever 528 and a subtractive multiply initiating lever 529. Both of these levers are pivoted on a short shaft (not identified herein) extending between the left side control plate 89 and the left side frame plate 82. Immediately adjacent these two levers is a third, or initiating, lever 530, which is likewise rotatably mounted on the shaft which pivotally supports levers 528 and 529. The forward end of this last-mentioned lever 530 carries a pin which underlies both the accumulate multiply lever 528 and the negative multiply lever 529, so that the third lever 530 is rocked (clockwise in FIG. 11) whenever either of these two keys 67 or 68 is depressed. The lever 530 has a downwardly extending projection 531 which terminates adjacent an ear 758 on a bellcrank 682, that is pinned to, or otherwise rigidly secured on, the left end of the shaft 439. Thus, the depression of either key 67 or 68, through the medium of lever 530, rocks the bellcrank 682, and hence shaft 439, to initiate a machine operation. Also, as explained above, it has been mentioned that the depression of either of the multiplication initiating keys 66, 67 or 68 is effective to initiate a left shift of the carriage to the extreme left-hand, or home, position shown in FIG. 1. When the carriage B reaches the home position, the override pawl 500 (FIG. 3) is operated (as described in the preceding section). This rocking of the override pawl depresses slide 504, which, in turn, rocks the bellcrank 508 (clockwise if viewed from the right, or counter-clockwise if viewed from the left). Such rocking of the override pawl forces the link 509 forwardly (to the right in FIG. 5) and rocks the bail 510 (in a clockwise direction in this figure). As shown in FIG. 5, the right leg of the bail 510 is extended downwardly as a lever 615. The lower end of this extension 615 carries a pin 616 that normally is embraced within a slot 617 formed in a lever 618. The forward end of the lever is pivotally mounted on an arm 620 that is rotatably mounted on a pivot stud 621, while the rear end of the lever is biased upwardly by any suitable means, such as spring 619. The arm 620 is connected by means of a link 622 to the lower end of an arm 623 which is pinned on, or otherwise rigidly secured to, the right end of a transversely extending shaft 532. This shaft 532 extends entirely across the machine from the right side frame 81 to the left side control plate 89 (as shown in FIG. 11). The left end of the shaft 532 carries an arm 670, on which is pivotally mounted an initiating link 671. This link is normally biased to an upper, or operative, position by any suitable means, such as a tension spring 672 tensioned between a seat in the link and a stud on the frame plate, as shown. The rear end of the link 671 is formed with a shoulder 673 adapted to engage an ear 674 formed on a bellcrank latch 675. The latch 675 is pivotally mounted on the left-hand control plate 89 by any suitable means, such as pivot stud 676, and is normally biased to a latching (clockwise) position by any suitable means, such as spring 677. The latch member 675 is formed with a shoulder 678, which normally engages a stud 357 on the forward end of a multiplication control lever 356. This latter lever is pivotally mounted on the control plate by any suitable means, such as stud 358, and at its rear end carries a pin 359 embraced within a slot 345 formed in the forward end of an initiating rocker lever 344. The latter lever is pivotally mounted on a stud 346 carried by the left-hand control plate 89 and is biased to an operative position (counter-clockwise from that shown in FIG. 11) by a relatively strong spring 348, tensioned between seats in the carriage frame plate and in the rear arm of the lever 344. Such rocking of the initiating lever from the force of spring 348 is, of course, blocked so long as the shoulder 678 of latch 675 underlies pin 357 on the forward end of the lever 356.

Normally the link 671 is held in an inoperative position by the bellcrank 682 which, as already mentioned, is mounted on the extreme left end of shaft 439. It will be recalled that this bellcrank is rigidly mounted on the shaft 439 and is rocked directly by the depression of either key 67 or 68. Also it will be recalled that the depression of key 66 is effective to rock the shaft 439 by means of a mechanism shown in FIG. 8. Thus, the bellcrank 682 is rocked (counter-clockwise in FIG. 11) upon depression of any of the multiplication initiating keys. The forward end of the forwardly extending arm of the bellcrank carries a pin 683 (see also FIG. 10), which overlies the upper edge of the link 671, whereby the link can rise only as far as permitted by the pin 683. Normally, this pin holds the link in an inoperative position in which the shoulder 673 is below the ear 674. However, when any of the multiplication initiating keys are depressed, the bellcrank 682 is rocked (counter-clockwise in FIG. 11) to enable the link 671 to rise from the force of its spring 672, whereupon its shoulder 673 will engage the ear 674 on latch 675. Thereafter, the rocking of shaft 532 (clockwise in FIGS. 5 and 10) from the operation of the override pawl, is effective to shift the link 671 rearwardly, thereby pushing the latch 675 rearwardly to disengage pin 357, thereupon both levers 344 and 356 rock to initiate a multiplication operation.

13. *Multiplication Program Control (FIGS. 4, 6, 9, 14 and 18)*

It will be recalled that multiplier values are stored in the segments 370 (FIG. 14) which assume an angular position representative of that ordinal value. During digitation, the operative one of these segments is returned toward its home, or "0," position in increments of "1" until the "0" position shown in this figure is reached. As the segment goes from its "1" to its "0" position, it rocks the control lever 373 (counter-clockwise in this figure). The rear end of this lever is connected by means of a link 380 to a hook member 381 which, in the lower, or "0," position shown, enables the hook thereon to engage a stud 382 on latch 383. The hook member 381 is pivotally connected to an arm 384 which is loosely mounted on a shaft 385. The arm 384 is rocked, and consequently the hook 381 is translated, in each cycle of machine operation by means of a roller 386 carried by cam 387 which is loose upon the main drive shaft 255 and which is embraced within a slot formed in a disk rigidly mounted on the shaft. Thus, the hook, or link, 381 is oscillated and the arm 384 is rocked in each cycle of machine operation. However, normally, this is not effective as the hook is held above the stud 382 by means of the shift control lever 373 being rocked to an operative position (clockwise from that shown in FIG. 14).

When the hook link 381 pulls the latch 383 forwardly, the latter releases a power arm 388 which is strongly biased to a shift-initiating position (counter-clockwise from that shown in FIG. 14) by means of a relatively strong spring 390. The arm 388 is pinned to the shaft 385, and a second arm 389 likewise is pinned on the shaft 385. The arm 389 is strongly biased to a rearward position (counter-clockwise from that shown in FIG. 14) by a relatively strong spring 390. Thus the release of latch 383, through the operation of hook 381 when it is lowered by control lever 373, releases the assembly of arm 388, shaft 385 and arm 389 to the force of spring 390, whereby the shaft 385 is rocked (counter-clockwise in FIG. 13). This rocking of the shaft is normally effective to disable the feed pawl which is operative to restore the segment in the operative position to its "0" position, and to initiate a right shift of both the carriage B and the multiplier carriage 372.

In the Friden patents mentioned, the rocking of shaft 385 was effective to initiate operation of the multiplier carriage shifting mechanism, which is indicated roughly in FIG. 9. In those patents, the shaft carried an arm rigidly mounted on the shaft, whereby the rocking of the shaft lifted a carriage feed pawl 393 from the inoperative position shown in dotted lines in this figure, the feed pawl engaging a rack on the multiplier carriage in the lifted position. However, in the present invention it is essential that this multiplier carriage shifting mechanism be disabled in certain conditions. For this reason, in the present invention the shaft 385 carries an arm 394 rigidly mounted thereon, while the feed pawl lifting arm 395 is rotatably mounted on the shaft. An interponent 396 is also rotatably mounted on the shaft 385, the interponent being connected to the fixed arm 394 by means of a spring 397 tensioned between a stud 398 on the interponent and the corresponding stud 399 on the fixed arm. A projection of the interponent engages a pin carriage on the loosely mounted arm 395, so that normally the rocking of arm 394, through the force of spring 397, lifts the lifting arm 395. However, a block is provided, which includes an arm 400 mounted on a transverse shaft 401. Normally, the shaft and arm lie in the position shown in full lines in FIG. 9. The shaft can be rocked (counterclockwise in this figure) so that the end of arm 400 lies to the rear of pin 398, whereupon the rocking of shaft 385 and arm 394 can no longer effect a rocking of the interponent 396 and hence arm 395 remains unmoved.

The rocking of the shaft 385 is effective to condition the shifting mechanism for the carriage B for an ordinal right shift of the carriage by means of the mechanism best shown in FIGS. 4 and 6. As shown in FIG. 4, this shaft 385 is journalled at its right end in the carriage frame plate 81. Adjacent the right shift clutch control rod 474, the shaft carries an arm 402 rigidly mounted thereon (see also FIG. 6). In substantially the same angular plane, an arm 403 is loosely mounted on the shaft 1471, which arm carries a pin 404 that engages the front end of the rod 474. Associated with the arm 402 is a second arm 405 that is loosely, or rotatably, mounted on the shaft 385. A pin 406 carried by arm 402 is embraced within a slot 407 formed in the second arm 405, so that both arms rock together while the second arm can be easily moved lengthwise of the shaft. As shown in FIG. 4, the second arm is resiliently biased to the left by a suitable spring 408 encompassing the shaft 335 and compressed between the hub of the arm 405 and the bearing carried by the right frame plate 81. In all operations other than multiplication, the second arm 405 is held to the right of the end of pin 404 by a bail 409 which is loosely mounted on the shaft 385, and which extends to the left sufficiently to engage the feed rack 410 of the multiplier carriage 372 (see FIG. 18). Thus, so long as the multiplier carriage is in its extreme right-hand, or inactive, position, the second arm 405 is held to the right of pin 404. However, as values are entered into the multiplier carriage, and that carriage is escaped to the left, the second arm 405 is enable to shift to the left, whereupon a shoulder 411 formed on the upper end thereof will engage the pin 404. Thereafter, the rocking of shaft 385, which is controlled by the ordinal operations of multiplication, will be effective to rock arms 405 and 403 and hence translate the right shift control rod 474 rearwardly to effect engagement of the right shift clutch 461.

The rocking of shaft 385 is also effective to disable the feed pawl which returns the segments 370 toward their "0" position. However this operation has no connection with the present invention, and hence it need not be described.

II. AUTOMATIC DECIMAL POINT MECHANISM

It has previously been mentioned that our present invention relates to what might be called an "Automatic Decimal Point Mechanism" for a calculating machine. By that we mean a mechanism by which products can be accumulated around a predetermined decimal point in the product register without the necessity of the operator determining the number of "0's" required in the multiplier and "pumping" them into the multiplier keyboard. It is, of course, obvious that the multiplicand, which is inserted in the main keyboard keys 50, can readily be placed around a predetermined decimal point, for the ordinal arrangement of these keys makes the placing of the decimal point in that keyboard factor an easy matter. It only requires that one of the decimal point markers 62 (see FIG. 1) be turned to present a contrasting color to the keyboard. However, the insertion of a decimal factor into the multiplier, which is entered through the ten multiplier keyboard keys 65, presents an entirely different problem. In the past, it has been necessary, in most machines of this type, for the operator to determine in advance the maximum number of decimal digits (values to the right of the decimal point) in the products to be accumulated, and thereafter, when inserting each multiplier factor, to count the number of decimal digits inserted and then to "pump in" a number of "0's" needed to complement that number with the maximum so determined. Thus, each insertion of a multiplier value requires considerable attention on the part of the operator in order to accumulate the products properly.

In the patent to Ellerbeck, No. 2,868,453, previously mentioned, the suggestion was made of automatically escaping the multiplier carriage a number of steps to the left, upon depression of one of the multiplier control keys, determined by the difference between the number of decimal digits entered after depression of a decimal point key and a predetermined number of decimal digits. In such a case, the decimal point indicator 62 for the main keyboard was set to its contrasting position and the multiplicand factor inserted around that decimal point. After determining the maximum number of decimal digits to be used in the multiplier, a decimal point control knob was set to indicate the desired number of decimal digits. Finally, a decimal point marker 63 for the product register was set to the proper postion. For example, if four decimal places were desired in the multiplicand and five decimal places desired in the multiplier, the keyboard decimal point marker 62 between the fourth and fifth orders was set to the contrasting, or decimal point indicating, position (as shown in FIG. 1); the decimal point control for the multiplier factor would be set to a "5" position; and finally, the register decimal point marker 63 would be set to a position to indicate a decimal point between the ninth and tenth orders of the register (all as is shown in FIG. 1).

The present invention is designed to accomplish the same results as that of the Ellerbeck patent in that by setting a control knob 701, the number of decimal digits in the multiplier factor (i.e., the number of digits following a decimal point) is set by the control knob and its associated numeral dial 702. The number of decimal points desired for the multiplicand is then determined and the keyboard decimal point indicator 62 is set accordingly. Finally, the decimal point indicator for the product register dials 71 is put in the proper position. For example, in FIG. 1 the machine is set for four decimal digits in the multiplicand keyboard, the multiplier selection mechanism is set for five decimal digits, as indicated in the dial 702, and accordingly one of the product decimal point markers 63 is set between the ninth and tenth orders of the register.

In our invention, the necessary controls to accumulate products with the proper decimal point placed at the predetermined point indicated by the decimal point marker (i.e., between the ninth and tenth orders in this instance) is determined by controlling the shifting of the carriage B upon initiation of a multiplication operation without effecting any artificial, or automatic, shifting of the multiplier carriage 372—which, in our invention, remains in the position in which it was escaped by the insertion of multiplier digital values through the keys 65. Thus, the same end result is accomplished as that shown in the Ellerbeck patent, but we secure that result by a mechanism which controls the shifting of the carriage B rather than through the shifting of the multiplier carriage. The mechanism of our invention is particularly adapted for the machine shown in the copending application of Malavazos, Ser. No. 736,091 of May 17, 1958, issued as Patent No. 3,045,907 on July 24, 1962.

In our present invention it is preferred that the machine be operated in the conventional manner, therefore, we provide a conditioning key 700 which either conditions the multiplication mechanism for control from the decimal point key, or not, at the will of the operator. We also provide a control knob 701 to determine the number of decimal digits, which knob is directly connected to the dial 702 visible through a window 703 in the machine cover. When the control key 700 is in the position shown in FIG. 1, the machine operates in the same manner as described in the Friden patents, Nos. 2,371,752 and 2,399,917, already mentioned. When this key is pulled to its forward position, as shown in FIG. 20, the automatic decimal point mechanism becomes effective and control is dependent upon the operation of a decimal point key 704 (FIG. 1), preferably placed adjacent the multiplier value keys 65.

A. *Decimal Point Conditioning Key (FIGS. 1, 10, 15, 18 and 20)*

The conditioning key 700 includes a key button, or top, with any suitable indicia thereon. Preferably, the key button is mounted on the upper end of a lever 720 which is pivotally mounted on a stud 721 carried by a bracket 722 mounted on the outside of the left-hand control plate 89. This lever, as is best shown in FIG. 20, has a pair of detent notches 723 formed in the rear edge thereof, which notches are adapted to engage a pin 724 carried by a detenting arm 725. The arm 725 (FIG. 15) is pivotally mounted on the bracket 722 by any suitable means, such as pivot stud 726, and the pin 724 thereon is resiliently biased into engagement with the notches 723 by any suitable spring, such as a tension spring 729 (shown in FIG. 18) connected between the outer end of pin 724 and the pivot stud 721, previously mentioned. Thus, the lever 720, which is freely rotatable on stud 721, is detented in either of its control positions by the detent mechanism just described. When it is in the rearward position shown in FIGS. 1, 10 and 15 in the preferred form of our mechanism, the decimal point mechanism is disabled. When it is rocked to its forward position shown in FIG. 20, it becomes effective to condition the machine for operation under the control of the decimal key by conditioning mechanisms for the following purposes:

(a) unlocking the decimal key 704 for operation;

(b) blocking all of the multiplier initiating keys 66, 67 and 68 against operation until after the decimal key 704 has been depressed;

(c) enabling a lock which blocks a double depression of the decimal point key during the insertion of a multiplier value;

(d) blocking operation of the shift control lever 337 (see FIGS. 14 and 18) until the register carriage B has been shifted to the proper ordinal position;

(e) disabling the multiplier carriage shifting mechanism shown in FIG. 9; and (f) blocking operation of the conventional multiplier repeat key until after the decimal point key 704 has been operated.

These mechanisms and their operation will now be described in sequence.

(a) *Unlock the decimal point key 704 (FIGS. 15, 18, 20 and 21).*—As best shown in FIG. 20, the lower end of the control lever 720 is formed as a rearwardly facing cam edge 727. This cam edge engages a pin 732 carried by an interponent 733. The interponent is pivotally mounted on any suitable means, such as on a sleeve 778 rotatably mounted on one of the spacing pins 728 that support the bracket 722 in spaced relationship to the left of the left-hand control plate 89 (see FIGS. 10 and 15). The interponent 733 is biased in a direction to engage the pin 732 with the cam edge 727 (clockwise in FIG. 20) by any suitable means, such as a tension spring 734 which is tensioned between a pin 735 on the upper end of the interponent arm and a corresponding stud 736 extending from the left side control plate 89. Thus the rocking of the control lever 720 from its inoperative position shown in FIGS. 10 and 15 to its operative position shown in FIG. 20 (clockwise in all of these figures), positively rocks the interponent arm 733 (counterclockwise in FIG. 20) against the tension of spring 734. Both the lever and the interponent are detented in this adjusted positioned by the effect of the detent pin 724 in the lower one of the notches 723, which detenting effect is sufficient to overcome the force of spring 734.

The interponent arm 733 also carries a pin 737 which engages a slot 743 formed in the rear end of a forwardly extending link 744. The forwardly extending link 744 is also slotted adjacent its forward end, as at 745, which slot embraces a pin 762 carried by a rearwardly extending projection 761 at the upper end of a two-armed lever 759. The link 744 is resiliently biased forwardly by a relatively light spring 746, except when overcome by a medium strength spring 763 associated with the upper arm 765 of the lever 759. The forward end of the link 744 carries an upwardly projecting blocking nose 747 that is adapted to block depression of the decimal point key 704 when the link is in its forward position. A shaft 714, which is rocked by the depression of the decimal point key 704, carries a decimal coupling arm 752 (FIG. 21) near its left end, and rigidly affixed thereto. This arm has a rightwardly extending ear 753 which, when the link 744 is in its normal forward position (to the right of that shown in FIG. 20), overlies the blocking nose 747 of the link. In that situation the key 704 cannot be depressed, because the depression of the key necessitates rocking of the shaft 714 and the coupling arm 752 (clockwise in FIGS. 15, 20 and 21). When, however, the key 700 is pulled forwardly to rock the control lever 720 (clockwise in FIG. 19), the rocking of the interponent arm 733 and the consequent rearward translation of link 744 moves the blocking nose 747 slightly to the rear of the ear 753, as is shown in FIG. 20. In this condition of the parts, the ear 753 misses the nose 747, and hence the key 704 can be depressed.

(b) *Block operation of the multiply initiating keys (FIGS. 20 and 21).*—In order to prevent misoperation on the part of an operator, which would occur if the operator were able to initiate operation without depression of the decimal point key when the machine is conditioned for that type of operation, we prefer to provide means for blocking depression of the multiplication initiating keys 66, 67 or 68 until the decimal point key 704 has been depressed. It will be recalled that depression of any one of the multiplication initiating keys 66, 67 or 68, is effective to rock the shaft 439 to initiate machine operation. Due to the fact that there is a direct connection between the respective keys and this shaft, it is obvious that any blocking of rotation of the shaft will prevent depression of the initiating key, thereby warning the operator that the decimal point has not been inserted in the multiplier factor and that the machine should not be operated until this has been done. The means for so blocking any rotation of shaft 439 is best shown in FIGS. 20 and 21. It will be recalled that this shaft carries at its extreme left end, on the outer, or left, side of the left-hand control plate 89, a bellcrank 632, the forward arm of which controls the operation of the multiplication initiating link 671, as described in connection with FIG. 11. This bellcrank is formed with an ear 758 at the extreme end of its upwardly extending arm. The lower arm 766 of the latch 759, which supports the forward end of link 744 as previously described, is provided with a hook-shaped latch 760 adapted to engage the ear 758 when the arm 759 is rocked to the position shown in FIG. 20. It will be recalled that the upper arm 765 of lever 759 is formed with a rearwardly extending projection 761 on which the pin 762 is secured. Also, a tension spring 763 of medium strength, intermediate the strength of weak spring 746 and relatively strong spring 734, is seated over pin 762, thereby resiliently biasing the lever 759 (counter-clockwise in FIG. 20) toward a latching position. When the key 700 is in its normal position (counter-clockwise from the position shown in FIG. 20) and the interponent arm 733 is permitted to rock forwardly (clockwise) in this figure) under the force of its spring 734, the pin 737, by its engagement with the forward end of slot 743, pushes the link 744 forwardly. In view of the fact that spring 734 is stronger than spring 763, it prevails over the force of spring 763, and, therefore, biases the link forwardly against the opposition of spring 763. Such movement of link 744 rocks the lever 759 (clockwise in FIG. 20) to the position shown in FIG. 21, whereupon the hook 760 is rocked away from ear 758 and the shaft 439 and bellcrank 682 are free to rock from depression of the multiplication initiating keys. On the other hand, when the key 700 is rocked to its forward position, thereby rocking the interponent 733 rearwardly (counter-clockwise in FIG. 20) against the force of spring 734, the force of spring 763 is sufficient to prevail over spring 746 and pull the link 744 rearwardly, thereby rocking the lever 759 to the counter-clockwise position shown in FIG. 20. In this situation, the shaft 439 and bellcrank 682 cannot be rocked until the lever 759 is rocked to the position shown in FIG. 21 by depression of the decimal point key. This will be described in section D, subsection (b), which describes the operation of the decimal point key and the mechanism by which the latching lever 759 is rocked to its disengaged position and latched in that disengaged position.

(c) *Block double depression of the decimal point key 704 (FIG. 20).*—When the decimal point key 704 rocks the latching lever 759 (clockwise from the position shown in FIG. 20 to that shown in FIG. 21), and the lever is latched in that position, as will hereinafter be described in section C, subsection (b), the blocking nose 747 of link 744 moves forwardly to block a second depression of the decimal point key 704. When the lever 759 is latched in its rocked position (and it is latched in that operated position), the spring 763 will no longer affect the position of link 744. Thus the relatively weak spring 746 is enabled to pull the link 744 forwardly until the rear end of the slot 743 engages the pin 737. In that event, the blocking nose 747 underlies the ear 753 of the decimal coupling arm 752 (FIGS. 15 and 18), and a second depression of the decimal key 704 is positively prevented.

(d) *Block operation of the multiplication shift control lever 373 (FIGS. 16, 18, 19 and 20).*—In the conventional Friden calculating machine, as described in the Friden patents above-mentioned, it is entirely immaterial whether the multiplication shift control lever 373 (FIGS. 14 and 18) is pivotally mounted on shaft 377, or whether it is affixed to the shaft and the shaft journalled in the respective frame plates. In the present invention, however, it is essential that this lever be blocked from conventional operation during the right shifting operations which may become necessary in order to properly align the decimal point of the products with the predetermined decimal position. For this reason it is desirable to block the operation of the shift control lever until the carriage has reached the proper ordinal position (which is determined by the number of digits entered into the multiplier factor after the depression of the decimal point key 704 as compared with the setting of the decimal point knob 701 and its dial 702). The simplest, and therefore most satisfactory way, of blocking operation of the shift control lever 373 is to pin it to, or otherwise rigidly secure it on, the shaft 377 (see FIG. 18). In this case, the shaft is journalled in suitable bearings carried by the left side control plate 89 and the intermediate, or auxiliary, frame plate 90. In the present invention, this shaft is extended a short distance to the left of the left-hand control plate 89, and at its left end carries a forwardly extending arm 770, likewise pinned to, or rigidly secured on, the shaft 377 (see also FIG. 20). This arm carries a leftwardly extending ear 771, which overlies a shoulder 775 (FIG. 20) formed on the upper arm 776 of a two-armed lever 777. This lever is mounted on the right end of a sleeve 778 that is rotatably mounted on the shaft 728, which sleeve at its left end carries an arm 779. This left-hand arm 779 is used to rock the lever 777 when the carriage reaches the position necessary for the initiation of multiplication as determined by the predetermined setting of the decimal point mechanism and the number of digits entered into the multiplier factor after the depression of the decimal point key.

For the moment it should be noted that the upper arm 776 of the lever 777 is resiliently connected to the interponent 733 by any suitable means, such as spring 780 tensioned between the stud 738 and a corresponding stud 781 carried by the arm 776. This stud 781 is so located on lever 777 as to engage the forward edge of the interponent 733, so that the rocking of the interponent to its normal position likewise forces the lever 777 to its normal, or inoperative, position. On the other hand, when the interponent 733 is rocked to its operative position (the counter-clockwise position shown in FIG. 20), the force of spring 780 pulls the upper end of the arm 776 in the same direction, thereby positioning the shoulder 775 under the ear 771 of lever 770. In this position, the rocking of arm 770 and hence shaft 377 and the shift control lever 373 are likewise blocked against rocking to an operative position, and the conventional multiplying operation will be blocked while the necessary rightward shifting of the carriage takes place. Then, when the proper ordinal position is reached, the lever 777 will be rocked in the opposite direction (clockwise in FIG. 20) to release the shift control lever for operation, as will be described under the heading "Operation" in section G hereafter.

(e) *Disable multiplier carriage shifting mechanism (FIGS. 9, 10 and 20).*—Normally, the multiplier carriage 372 is shifted one order to the right with each ordinal shifting of the register carriage B, multiplication taking place under the control of the lowest order in which a value has been inserted and then the adjacent higher orders in sequence. In the present invention, it is necessary that the multiplier carriage be locked against a shifting operation until such time as the register carriage B is in the proper ordinal position for the beginning of the multiplication operation. We, therefore, block operation of the carriage shifting mechanism until the proper order is reached. For this purpose, we utilize the rocking of the two-armed lever 777 (FIG. 20). The lower leg 787 of this lever is provided with a slot 788 which embraces a pin 789 riveted to, or otherwise rigidly secured on, an arm 790. The arm 790 is rigidly mounted on the left end of the shaft 401. It was mentioned in connection with the feeding of the multiplier carriage shifting mechanism, as described in part I, section 13, above, that the right-hand end of this shaft 401 (shown in FIG. 9) carries an arm 400 which normally lies above the multiplier carriage shifting mechanism including the assembly of arm 394 fixed on shaft 385, the rotatably mounted interponent 396 and the feed control arm 395. When the arm 400 lies in the normal position shown in FIG. 9, the shift pawl control arm 395 rocks with the rocking of shaft 385 and hence the rocking of that shaft is effective to cause an ordinal shift of the multiplier carriage. However, when the shaft 401 is rocked (clockwise from the position shown in FIG. 10 to that shown in FIG. 20—and counter-clockwise in FIG. 9 from the position shown in full lines to the dotted line position), the end of arm 400 engages the stud 398 on interponent 396 and thereby prevents rocking of the interponent. In this situation, rocking of shaft 385, and arm 394 fixed thereto, is ineffective to cause a multiplier carriage shifting operation as the spring 397 yields to enable the arm 394 to operate while an operation of the arm 395 is completely blocked. By this means the multiplier carriage 372 is blocked from any shifting operation during the automatic aligning phase of a multiplication operation, the multiplier carriage 372 remaining in the position to which it was adjusted by the insertion of values thereinto.

It can be noted here that when the lever 777 is rocked to its normal position (clockwise from that shown in FIG. 20 to that shown in FIG. 10), the rocking of arm 790 (counter-clockwise in FIG. 20) and shaft 401 lifts the arm 400 to the full line position shown in FIG. 9, so that thereupon the multiplier carriage shifting mechanism is again rendered operative.

(f) *Block operation of multiplier repeat key 1025 (FIGS. 15, 18, 20 and 21).*—It is desirable, in an automatic decimal point mechanism, to block operation of the conventional multiplier repeat key 1025 (whenever the machine is conditioned for operation under control of the decimal point mechanism) until the decimal point key 704 has been operated. This interlock is not essential, but it is desirable as it prevents the setting of a multiplier factor for repeat operation until the decimal point key has been manipulated to insert the decimal point into the multiplier factor, which manipulation of the decimal point key is necessary before the machine can be operated. Various mechanisms for blocking the operation of the repeat key could be suggested, but we prefer the relatively simple mechanism shown. It will be seen, in FIG. 15 especially, that the repeat key 1025 is mounted on the upper end of an ear, or bracket, 1026, projecting upwardly from a setting slide 1027 which is slidably mounted on the top multiplier keyboard frame plate 368, as shown in FIG. 15. In the present invention this slide carries a rather long leftwardly extending pin 795 (see FIG. 18) riveted to a bracket, or ear, 796 formed at right angles to the repeat slide 1027. This pin is utilized for several purposes in the present invention, but for the moment it is of interest because it forms the means of blocking operation of the slide from the normal inactive, rearward position shown in these figures.

Associated with the pin 795 is a locking lever 797, which is rockably mounted on the shaft 714 (see FIGS. 20 and 21). The rearward end of the lever 797 is rocked downwardly by any suitable resilient means, such as tension spring 798, tensioned between a stud on the rear arm of the lever and the stud 736 on the frame plate. The rear end of the this lever is formed with a rearwardly and upwardly oblique cam edge 799 adapted to engage the pin 735 carried by the interponent 733. The forward end of the latching lever 797 is formed as a nose, or hook, 800 adapted to engage the pin 795 when the latching lever is rocked to its operative position shown in FIG. 20. When the control key 700 is in its rearward, or disabling, position, and the interponent 733 is rocked forwardly (clockwise from that shown in FIG. 20) under the force of its spring 734, the pin 735, through its engagement with the cam edge 799, rocks the latching lever 797 (clockwise in this figure), so that nose 800 releases pin 795. In this condition, the repeat mechanism is enabled to operate in its conventional manner. When, however, the conditioning key 700 is rocked to the forward position shown in FIG. 20, thereby forcing the interponent 733 rearwardly (to the counter-clockwise position shown in this figure), the spring 798 pulls the rear end of the lever 797 downwardly and thereby rocks the nose 800 into a position in which it blocks forward movement of the pin 795. Thereafter, the repeat key 1025 cannot be moved forwardly until the pin 795 has been released by the depression of the decimal point key 704, as will now be described.

It has been mentioned that the decimal point key 704 is directly connected to shaft 714, so that the depression of the key rocks the shaft 714 (see FIG. 14) and the coupling arm 752 (see FIG. 21) which is rigidly mounted thereon. The rocking of the coupling arm 752 is effective to latch certain parts in an operative condition through the medium of an interponent arm 754 (FIG. 21), which is rotatably mounted on shaft 714 immediately to the right of the coupling arm 752. This arm carries a rightwardly extending ear 755 (FIG. 18), which is adapted to be engaged by the latching shoulder 751 of a latch arm 750 which is rotatably mounted on a shaft 756. This latching arm 750 is resiliently biased to the rear (counter-clockwise in FIGS. 20 and 21) by any suitable spring, such as the spring 746 which biases the link 744 forwardly. The ear 753 of the coupling arm 752 overlies the interponent arm 754, so that the rocking of the coupling arm 752 rocks the arm 754 downwardly. Thereupon, the ear 755 on the interponent arm engages the upper cam edge of the shoulder 751 on latch 750, rocking the latch forwardly (clockwise in FIG. 21) against the force of spring 746. When the ear 755 passes below the shoulder 751, the spring 746 obviously pulls the latch member 750 rearwardly, thereby latching the interponent arm 754 in its lower, or latched, position shown in FIG. 21.

The ear 755 on the latchable interponent arm 754 overlies a cam edge 764 on the upper corner of the lever 759, so that the downward rocking of this arm from the movement of coupling arm 752 is effective to cam the latching arm 759 (clockwise from the position shown in FIG. 20 to that shown in FIG. 21). Also, the ear 755 overlies the upper edge of the forward arm of blocking lever 797, so that the latching of the interponent 754 in its lower position is effective to rock the forward leg of the lever 797 downwardly against the force of its spring 798, and thereby release the pin 795 from nose 800. As the interponent 754 is latched in the position shown in FIG. 21, this ear holds the arm 797 in its inoperative position (shown in this figure) until the latch 750 is released at the end of the multiplication operation. Thus, the depression of the decimal point key 704 is effective to release the repeat key 1025 for conventional operation.

B. *Setting Knob (FIGS. 10, 11, 15, 17 and 18*

The number of decimal digits in the multiplier factor is controlled by the setting knob 701, the value position of which is indicated by the dial 702, which is seen through the window 703 in the machine cover (FIG. 1). The setting knob 701 and dial 702 are mounted on a common shaft 805. Preferably, the shaft 805 is square, so that there will be no relative rotation between the knob 701 and dial 702. This shaft is provided with a suitable bearing insert 806 journalled in the mounting bracket 722, and the inner, or right-hand, end is journalled in a suitable bearing in left-hand control plate 89. Obviously, the rotation of the knob changes the angular setting of the dial. The setting assembly, including the knob 701, shaft 805 and dial 702, is held in a predetermined value position by a suitable detent means. Any one of a number of such detent means could be suggested but we prefer to use a detent arm 807 (FIGS. 15 and 18) which is pivotally mounted on the shaft 714 and is biased by a suitable spring 808 into engagement with an internal star wheel 810 formed within the dial 702. At its rearward end, the arm 807 carries a roller stud 809 (FIG. 17) which engages the interdental spaces in the internal star wheel formed in the interior of the dial.

It should be noted here that a gear 815 is mounted rigidly on, or formed integral with, the dial 702. This dial gear constantly meshes with a gear segment 816 that is rigidly mounted on the right-hand end of sleeve 817 (FIGS. 17 and 19) that is rotatably journalled on a stub shaft 818 that is rigidly mounted in the bracket 722. The left end of the sleeve 817 carries a two-armed lever 819 (FIGS. 10, 12, 15, 17 and 19). This lever 819 is obviously set in a predetermined one of a number of ordinal positions determined by the setting knob 701 and dial 702. It is used, as will be explained in section D hereafter, to determine the operation of the various controls for the decimal point mechanism.

It should be noted that the lands 820 (FIGS. 11 and 19) on the ends of the gear segment 816 prevent the turning of the dial 702 through the "1" or "10" positions, i.e., the dial is blocked from turning backward from "1", or forward from "10", by the lands 820.

C. *Multiplier Carriage Position Gear (FIGS. 11, 14 and 18)*

In our invention, the number of rightward shifts of the carriage B is determined by the relative position of the gear segment 816 and its stop arm 819 with respect to a second gear, the angular position of which represents the ordinal position of the multiplier carriage 372. It will be recalled that the multiplier carriage 372 is shifted ordinally to the left as values are inserted thereinto by means of the lever 374 (FIG. 18) operating under the force of strong spring 376. In our invention this lever 374 has a third leg 825 on which a rearwardly extending link 826 is pivoted by any suitable means, such as pin 827. The rear end of the link 826 is formed as a vertically extending bracket 828. A pin 829 pivotally connects the bracket 828 to a gear segment 830 that it pivotally mounted on the intermediate left-hand side frame 90 by any suitable means, such as stud 831. The teeth 832 formed on the lower end of the segment 830 constantly mesh with corresponding teeth 837 formed on the upper end of a second gear segment 838 (FIG. 14). The second gear segment 838 is pinned to, or otherwise rigidly secured on, a short shaft 839 journalled in the intermediate frame plate 90 and the left-hand control plate 89 (FIGS. 14 and 11). The left end of the shaft 839, as shown in FIG. 11, carries a large gear segment 840, which is also rigidly pinned to the shaft. The teeth 841 of the large segment 840 mesh with the teeth 842 of a gear segment 843 that is rotatably mounted on the sleeve 817 (FIGS. 11 and 19). It is believed obvious that the gear segment 843 (which preferably assumes the shape shown in FIG. 11) is angularly positioned in accordance with the ordinal position of the multiplier carriage 372. The gear segments 840 and 843 are shown in FIG. 11 in the position they are when the multiplier carriage 372 is in its home position. As values are inserted into multiplier unit, and the carriage is moved order-by-order to the left, the large segmental lever 840 rocks forwardly (clockwise in FIG. 11) and the gear segment 843 turns (counter-clockwise in this figure) to an angular position representing the ordinal position of the multiplier carriage 372.

It is seen that the segmental lever 840 carries a cam projection 844 on its forward end (the right end in FIG. 11). When the multiplier carriage is moved to its overthrow position one order to the right of its normal, or home, position, and the gear segment 840 is rocked to its extreme rearward position (counter-clockwise position in FIG. 11), this cam nose engages an ear 749 on the lower end of the latch lever 750, thereby rocking the latch lever to its unlatching position. This rocking of latch lever 750 is effective to release interponent 754, so that the various mechanisms can return to their normal positions.

The gear segment 843 forms the positioning member of a resiliently connected assembly which includes a segmental coupling rack 850 (see FIGS. 17, 19 and 22) which is also rotatably mounted on the sleeve 817. The segmental rack 850 is permitted movement relative to the gear segment 843, but this movement is limited to one or the other of two angular positions by means of a coupling lever 851 (FIGS. 11 and 19) that is pivotally mounted on the gear segment by any suitable means, such as pin 852. The extreme end of the coupling lever 851 is provided with a slot 853 that embraces a pin 854 carried by the segmental rack 850. Thus, the segmental rack 850 can assume an angular position relative to the gear segment 843 determined by the limit of travel of the pin 854 in the slot 853.

The pin 854 is engaged by one of the detent notches 855 (FIGS. 11 and 19) formed in one arm of a bellcrank detent lever 856. This bellcrank detent is pivotally mounted at its elbow on a pin 857 riveted to the segmental gear 843. A spring 858, tensioned between the other leg of the bellcrank 856 and a seat in the gear segment, resiliently biases the notches 855 into engagement with the pin 854. Thus, the coupling rack 850 is held in one or the other of two positions relative to the gear segment 843, which, in turn, is angularly positioned in accordance with the position of the multiplier carriage 372. It can be noted at this point that the coupling lever 851 carries a laterally extending ear 859 which, in the position of the parts of the assembly shown in FIG. 11, lies outside the periphery of a feed segment 880 (as shown in FIG. 13). However, when the coupling rack 850 is rocked angularly with respect to the gear segment 843, the coupling ear 859 then engages one of the notches, or interdental spaces, 883 formed in one portion of the periphery of the feed segment 880 to couple the presently described gear assembly with that segment, for the purposes described in section D hereafter.

D. *Decimal Point Key (FIGS. 13, 14, 15 and 18)*

The decimal point key 704 preferably is mounted immediately adjacent the keyboard keys 65, as is shown in FIG. 1, and preferably is marked with a dot to indicate a decimal point, as shown. This key preferably is mounted for substantially vertical movement in the machine by the means shown in FIGS. 14, 15 and 18. This preferred mounting means comprises a pair of rods 705 that are riveted on, or otherwise rigidly secured to, rearwardly extending brackets formed on the upper frame plate 368. These rods are embraced within closely fitting channels 706 formed in the key top 704, whereby the key top 704 is slidably mounted on the rods 705. The key top 704 is resiliently biased to a raised position by one or more suitable springs 707 which can surround one or both rods 705 and is compressed between the bottom of the key top and the frame plate. The key top 704 is blocked from being lifted off its rod 705 by virtue of its connection to the shaft 714, as will now be described.

The key top 704 carries a bracket member 710. The rearward leg of the bracket 710 is bifurcated to form a slot 711 which embraces a pin 712 carried by a forwardly extending arm 713 that is pinned to, or otherwise rigidly secured on, the control shaft 714. This shaft is blocked against overrocking to the extent that the key 704 could be lifted off the rods 705 by virtue of an interponent 891 (FIG. 22) which is pivotally mounted on the coupling arm 752. It has already been mentioned that the coupling arm is pinned on the left end of the shaft 714. This interponent is formed with a shoulder 896 which engages a pin 897 riveted to the control plate 89, so that rocking of shaft 714 (counter-clockwise in FIG. 22) and consequent lifting of key 704 is limited.

It has been intimated that the decimal point key 704 is depressed by the operator at the proper place in the insertion of a multiplier factor. For example, if the multiplier factor should be "12.375," the decimal point key 704 would be depressed between the insertion of the digital values "2" and "3." It has also been intimated that the depression of this key is effective, when the machine is conditioned for automatic decimal point operation, to release a latch, or interlock, which prevents operation of the machine. Thus, if the multiplier value is the whole number "12," it would be necessary to depress the decimal point key 704 following the insertion of the value "2." It can be noted here that among other things the depression of the decimal point key couples the feed segment 880 (FIGS. 13 and 19) to the gear assembly which represents the multiplier carriage position. Thereafter, the feed rack, or segment 880 is rotated along with the gear 843 so long as decimal values are inserted into the multiplier storage register through the multiplier value keys 65. It will be understood that normally this feed segment will be held in a "0" position by a spring, as will hereinafter be described in subsection (d) below, whereby that segment will be moved a number of steps corresponding to the number of decimal digits inserted into the multiplier factor. The depression of the decimal point key 704 does a number of things to condition the machine for operation, as follows:

(a) sets a decimal point indicator in the multiplier storage dials 371 which is visible through the window 69 (FIG. 1);

(b) unlatches the initiating shaft 439 for operation by one of the multiplier keys;

(c) unlatches the repeat key; and (d) connects the carriage position indicating gear assembly 843 and the feed segment 880.

These operations will now be discussed in sequence.

(a) *Set decimal point indicator* (*FIG. 14*).—It will be recalled that the decimal point key 704 carries a bracket 710 and that this bracket has a pin-and-slot connection 712, 711 with the arm 713 which is rigidly secured to the shaft 714. The arm 713, as shown in FIG. 14, carries a nose 715, which nose cooperates with one of a series of ordinal latches to release one of a series of decimal point indicators. A thin decimal point indicator plate 865 is pivotally mounted on the transverse shaft 378 of the multiplier carriage 372, between each pair of segments 370. These indicating plates can be of extreme thinness and one will lie between each pair of the segments. Each of these plates carries a decimal point extension, or pointer, 866 normally lying below the window 69. The respective decimal point indicator plates 865 are resiliently biased to a position (counter-clockwise from that shown in FIG. 14) in which the pointer 866 is in an indicating position in which it is visible through the window 69, as by means of a tension spring 867 tensioned between a forwardly extending arm 868 and a latch arm 869. Each of the various indicators 865 is latched in an inoperative, or nonindicating, position by a coordinal latch arm 869, these arms being pivotally mounted on a transverse shaft 870 which is supported by projections 871 formed on the end plates of the multiplier carriage 372. Each of the latch arms 869 has a laterally extending pin 872 mounted on the rear end thereof, which pin is embraced within an L-shaped slot 873 formed on the front corner of the indicator carrying arm 865. The spring 867 resiliently biases the latch arm 869 to a latching position (the clockwise position shown in FIG. 14) and the indicating arm 865 to an indicating position (counter-clockwise in this figure). Normally, the pin lies in the offset portion of the slot 873, thereby holding the indicating arm 865 in its forward position, in which it is not visible through the window 69. However, when the arm 713 is rocked by depression of key 704, the nose 715 thereon engages the latch lever 869 coordinally aligned therewith. Thus, the depression of the key 704 rocks the coordinal indicator latch 869 (counterclockwise in FIG. 14), whereby the pin 872 is forced out of the offset portion of the slot and into the long portion thereof, so that the indicator arm 865 is free to move to indicating position from the force of spring 867. As this indicator arm is carried on the multiplier carriage shaft 378, it shifts ordinally to the left as other values are inserted thereafter.

(b) *Release shaft 439 for operation by multiplication keys* (*FIGS. 20 and 21*).—It has already been mentioned that the coupler arm 752 is rigidly mounted adjacent the left end of the shaft 714 and hence is rocked (clockwise in FIG. 21) upon depression of the decimal point key 704. This arm 752 carries an ear 753 extending to the right which overlies the floating, or rotatably mounted, interponent arm 754. This arm 754 is rotatably mounted on the shaft 714 and is biased to an upper inoperative position (counter-clockwise in FIG. 20) by a suitable spring 763. This floating arm 754 is provided with an ear 755 on its forward end which is adapted to engage the shoulder 751 on the upper end of the latch arm 750. The rocking of the coupling arm 752, through the engagement of its ear 753 with the upper edge of the floating arm 754, rocks the latter until the ear 755 thereon passes the shoulder 751. Thereupon, the latching arm 750 engages ear 755 and holds the arm 754 in its lower position shown in FIG. 21. The ear 755, in the course of its downward movement from the position shown in FIG. 20 to that shown in FIG. 21, engages the cam edge 764 of the blocking lever 759, and hence rocks the lever 759 (clockwise from the position shown in FIG. 20 to that shown in FIG. 21).

The floating arm 754, being latched in its downward position, thereafter holds the latching arm 759 in the clockwise position shown in FIG. 21, and hence releases the ear 758 on the bellcrank 682 which is mounted on the extreme left end of shaft 439 (FIG. 10). Thereafter, the depression of any of the multiplier keys 66, 67 or 68, is effective to rock the bellcrank and the shaft 439 to initiate a multiplication operation. However, until the decimal point key 704 is depressed, multiplication is prevented by the locking of the hook 760 under the ear 758 of the bellcrank 682.

Incidentally, it should be mentioned again that the return of the gear segment 840 (FIG. 11) to its normal position, in which the multiplier carriage is in its home position, causes the nose 844 on the forward end thereof to engage the ear 749 on the lower end of the latching arm 750. Thereafter, the shifting of the carriage to its overstroke position, which is conventional in the machine of the Friden patents, Nos. 2,371,752 and 2,399,917, already mentioned, in order to return the multiplier segments 370 to their "0" position, is effective to rock the latch 750 (clockwise in FIGS. 11 and 21) to release arm 754 and thereby permit all of the parts to return to their normal, inoperative position.

(c) *Release the repeat key 1025 for operation* (*FIGS. 18, 20 and 21*).—The latching of the floating arm 754 in its lower position shown in FIG. 21 is also effective to release the repeat key slide 1027 for operation. The ear 755 of the floating arm 754 also overlies the upper edge of the lever 797, as shown in FIGS. 18 and 20, so that when it is latched in its lower position, it rocks the lever 797 away from the pin 795 carried by the repeat key slide 1027. Thus the repeat key can be set to its forward, or operative, position after depression of the decimal point key, but not before. Of course at the end of the operation, when the latch 750 is released and lever 754 rises to its normal position, the spring 798 returns the latch lever 797 to its latching position. If the repeat key was set for a repeat operation, then the flat portion of the nose 800 on the forward end of the lever 797 will engage the under surface of the pin 795, thereby holding the latch lever out of the way until the repeat key is returned to its normal inoperative position. If on the other hand, the repeat, or "REP," key 1025 has not been set to its operative position, it is again latched in its inoperative position. In other words, the repeat key is latched in an inoperative position in each successive multiplication until the decimal point key has been operated.

(d) *Connect multiplier carriage position gear train with feed rack 850* (*FIGS. 12, 13, 15, 17, 19 and 22*).—

A fourth effect of the depression of the decimal point key 704 is to couple the carriage position gear train (including the gear segment 843 and the coupling segment, or rack, 850) to the shift control segment 880 (FIGS. 12, 13, 15, 17 and 22). The actual shifting of the register carriage at the initiation of a multiplication operation, in order to properly align the decimal point of a product with a predetermined decimal point in the register, is controlled by the shift control segment 880 (FIGS. 13 and 19) which is rotatably mounted on the sleeve 817 immediately adjacent the coupling segment 850 (as shown in FIG. 17). This control segment has an integral large diameter hub 881 and is provided with a feed rack 882 on the lower arcuate section thereof and a series of locking notches 883 provided on the upper section of the periphery, as best shown in FIGS. 13 and 19. A stop shoulder 884 between the two sections presents a stop for the ear 859 of the coupling lever 851 (FIG. 11) to prevent overrotation of the coupling gear with respect to the locking notches 883. A long pin 885 is rigidly mounted on the control segment 880 and extends to the left, the pin being of sufficient length to extend past a locking plate, or repeat setting comb, 915 and its large diameter hub 917, and the two-armed lever 819 (as shown in FIGS. 12, 15 and 19) which is positioned by the setting knob 701. A light spring 886 (FIGS. 12 and 19) is tensioned between the pin 885 on the segment 880, over the hub 917 of the repeat comb 915, to a stud 887 carried on the forward arm of the two-armed lever 819. Thus the segment 880 is resiliently biased to the position in which the long pin 885 abuts the tail of the lever 819, i.e., to the position determined by the setting of knob 701.

The locking notches 883 of the control segment 880 are adapted to be engaged by the ear 859 on the coupling lever 851, whenever the coupling segment 850 (FIGS. 19 and 22) is shifted (in a clockwise direction in both figures) by the operation of the decimal point key 704. Normally, this ear (as shown in FIG. 13) lies outside the periphery of these notches, so that the segment 880 is free to assume the position determined by the engagement of pin 885 with lever 819. However, when the coupling segment 850 is so shifted, the ear 859 is retracted toward the shaft 818 and thereby engages one of the notches 883 formed in the upper portion of the periphery of this segment. Thereafter, the rotation of the carriage position gear assembly (including the gear segment 843, coupling lever 851, and coupling segment 850) as they are rotated by the ordinal shifting of the multiplier carriage 372, carries the control segment 880 with it.

It is seen in FIGS. 15 and 22 that the coupling arm 752 carries a coupling pawl 891. This pawl is mounted on the extreme end of the coupling arm 752 by any suitable means, such as stud 892. The pawl is biased into engagement with the periphery of the coupling segment 850 by any suitable resilient means, such as spring 893 tensioned between a seat on the pawl and a corresponding seat on a rearwardly extending tail of the coupling arm 752. The pawl is provided on its lower end with a single tooth, or nose, 894 adapted to engage one of the rack teeth 895 formed on the coupling segment 850 upon depression of the decimal point key 704. Thus the coupling segment 850, which is rotated along with the gear segment 843 by means of its pin 854 being engaged in the slot 853 of coupling arm 851 (FIG. 11) and one of the detent notches 855 of the detent bellcrank 856, is rocked relative to gear segment 843 to the extent permitted by slot 853. That is, upon depression of the decimal point key 704, the feed pawl 891 shifts the coupling segment one increment, or tooth space (clockwise in FIGS. 19 and 22), and thereby moves the pin 854 (clockwise in FIG. 11) into the other detent notch 855 on the detent arm 856. This moves the extremity of arm 851 toward the center, i.e., the shaft 818, and thereby causes the ear 859 to engage one of the interdental spaces in the locking notches 883 formed on control segment 880, and indicated by the dotted line position 859–a in FIG. 13. Thereafter, this control segment will have to rotate with the gear segment 843 away from the position to which it is resiliently biased by spring 886. Incidentally, this direction of rotation of the control segment 880, due to its coupling with the gear segment 843 (counterclockwise in FIGS. 11, 13 and 19), moves its pin 885 away from the tail of lever 819 (FIGS. 12 and 19).

It can be noted at this point that when the segment 880 returns to its home position shown in FIGS. 15 and 19, the pin 885 engages the forwardly extending arm 779 that is rigidly mounted on the sleeve 778 (FIG. 20) which also rigidly carries the lever 787. Thus, rotation of the segment 880 (counter-clockwise in FIG. 15) resulting from its coupling to the gear segment 843, will eventually rock the lever 787 (clockwise in FIG. 20) to disable the rightward shifting of carriage B and to enable the conventional multiplier segment feed pawl and carriage shifting mechanism. On the other hand, the setting of the knob 701 and dial 702 from their "1" decimal digit position toward the "10" decimal digit position incrementally steps the control segment 880 away from this shift terminating position, from the force of its spring 886 connecting the segment to lever 819. The coupling of this control segment 880 to the gear segment 843, however, has the effect of stepping the segment back toward the shift terminating position one increment with each insertion of a value into the multiplier carriage, so as to decrease the number of automatic shifts determined by the setting of knob 701 and dial 702 by the number of decimal digits that are inserted in the multiplier factor. Incidentally it can be noted at this point that the coupling ear 859 is cammed out of its engageing position whenever the segment 880 is first positively fed (counter-clockwise in FIGS. 13 and 10), as it is during each shifting cycle of the automatic multiplication program. This last-mentioned operation will be described in Section G hereafter.

E. *Interlock Against Excessive Decimal Digits (FIGS. 10, 14, 15, 16 and 18)*

One of the desirable interlocks associated with the mechanism of our invention is one which will prevent the insertion of more decimal digits than the number determined by the setting knob 701 and dial 702. For example, if the knob and dial are set for five decimal digits and by mistake the operator tried to insert six, the multiplier keyboard is locked to notify the operator of this misoperation. On the other hand, the insertion of one to five decimal digits after the depression of the decimal point key proceeds in the normal way, and without any added load on the keys. However, when the operator attempts to insert the sixth decimal digit, the keyboard is locked against any depression, so that the operator is immediately notified that a mistake has been made. The mechanism preferred for this interlock is relatively simple and is shown in FIGS. 10, 14, 15 and 16.

The control segment 880 carries a stud 888. Associated with the stud 888 is an oddly shaped, two-armed lever 901 (best shown in FIG. 15) which is pivotally mounted on the bracket 722 by a suitable pivot stud 902. The lever 901 and stud 888 are so arranged that when the dial 702 is set for one decimal digit, the stud 888 just engages the tail of the lever 901. This lever is shaped so that its rearward end, or tail, lies outside of, i.e., to the left of, the segment 880, and its forward end lies adjacent the left side control plate 89 adjacent the top multiplier keyboard frame plate 368. As best shown in FIG. 15, the forward end of the lever 901 is formed as an ear 903 which engages the rear edge of a locking lever 904 which is pivoted on, and immediately underlies, the upper keyboard frame plate 368. As shown in FIG. 15, this lever is pivotally mounted at an intermediate point of the front edge of this frame plate, as at 905. The locking lever 904 is conventional in the Friden machine with which our invention is preferably associated, and is used to lock the multiplier value keys 65 against operation. For this purpose, a bellcrank lever 906 is rockably mounted adjacent the front edge of the frame plate 368, as upon a shaft 907. Normally, this lever 904 is held in an inoperative position (clockwise position shown in FIG. 15) by a suitable spring 908. A horizontal arm of the bellcrank 906 underlies a bar 909 which is rocked by the depression of any of the value keys "1" to "9" to operate the carriage escapement mechanism and the zero latches which release the segments 370, as described in the Friden patents mentioned. In our invention, the locking lever 904 is provided with an ear 910 which is barely engaged by the ear 903 of lever 901. Normally the locking lever 904 is rocked by a pin 911 on the repeat key slide 1027, but in our invention is also rocked by the rocking of lever 901. In the normal position of lever 904 shown, the bellcrank 906 is free to rock, so that the operation of bar 909 is unhampered. However, when the lever 901 is rocked by the engagement of pin 888, the ear 903 engages ear 910 to rock lever 904 (counter-clockwise in FIG. 15), whereupon the right end of locking lever 904 moves into a position to block any appreciable rocking of bellcrank 906 from the operation of bar 909. Hence, as the bar 909 is locked against movement, the keys 65 are locked against depression.

It will be understood that the stud 888 barely abuts the tail of the lever 901, when the dial 702 is set for one decimal digit. As this dial is set to increase the number of digits, the resilient connection between the segment 880 (the spring 886), causes this segment to rotate (clockwise in FIGS. 10 and 15) in angular increments corresponding to the rotation of the gear segment 816 (FIG. 11) and the two-armed lever 819 (FIGS. 10 and 15). Thus if the dial 702 is set at number "5" to indicate five decimal places in the multiplier factor, the segment 880 will be rotated by the force of spring 886 four increments away from the tail of lever 901. Then, when the segment 880 is coupled to the segment 843 (which is rotated directly by the escapement of the multiplier carriage as heretofore described), the segment 880 is positively returned (counter-clockwise in FIGS. 10 and 15) toward the tail of lever 901. Thus if four decimal digits are entered into the multiplier keyboard after the depression of the decimal point key, the segment 880 will have been returned four angular increments to the position shown in these figures. At this point the stud 888 will engage but not rock the tail of lever 901, and hence will not be effective to rock the lever 901. If, on the other hand, five decimal digits are inserted after the depression of the decimal point key 704, the stud 888 will rock the lever 901 after the value key 65 is released, for the escapement, as is conventional in this type of machine, takes place as the key rises to its normal position. As the carriage escapes, the control segment 880 is rocked, which then causes stud 888 to rock lever 901, and that rocks lever 904 to block any subsequent movement of bar 909. Hence the fifth decimal digit can be inserted, for the segment 880 will not rock sufficiently to rock lever 901, and hence the blocking lever 904, until after the value has been inserted in the multiplier carriage and the value key is released. However, no further values may be inserted into the multiplier, for thereafter bar 909 is locked against operation. Thus the interlock just described prevents the operator from inserting too many decimal digits after depression of the decimal point key, and the number of digits permitted is automatically determined by the setting of the knob 701 and dial 702.

F. Interlock Against Exceeding Capacity of Multiplier Unit (FIGS. 10 to 13, 15, 17 and 19)

In order to guarantee against a misoperation on the part of the operator, it is desirable to provide an interlock which prevents the operation of the decimal point key 704 whenever its operation would cause the attempted insertion of a value exceeding the capacity of the multiplier unit. In the machine with which our invention is preferably associated, and that described in the patents to Friden, Nos. 2,371,752 and 2,399,917, the multiplier mechanism is limited to ten orders. For example, if we assume that in this machine the decimal digit knob and dial 701, 702 are set for five decimal digits and that six whole digits are inserted before the attempted operation of the decimal point key 704, it is obvious that the multiplier factor would require eleven orders. Thus, the attempted operation of the decimal point key, in the assumed example, after the insertion of six whole digits, would exceed the capacity of the machine. If the decimal point were inserted at this point, and later one of the multiplier control keys were operated, there could be only four decimal points in the multiplier and hence the decimal point in the product register would not be in the proper ordinal position. Therefore, in order to prevent this type of misoperation, it is preferred to provide a means which blocks the operation of the decimal point key 704, whenever there is an insufficient number of ordinal spaces remaining for the insertion of the predetermined number of decimal digits. The mechanism is relatively simple and is shown in FIGS. 10 to 13, inclusive, 15, 17, and 19.

It will be recalled that the segment 880 (FIGS. 13 and 19) is resiliently held by the spring 886 (FIGS. 10, 12 and 15) in the position determined by the lever 819, and that position, in turn, is determined by the setting of the dial 702. This segment is shown in FIG. 13 in the position it would occupy if the dial were set for a single decimal digit. As the number of decimal digits is increased, this segment is incrementally stepped (clockwise from this position). Hence, in this figure, the coupling ear 859 lies in opposition to the first detent shoulder, or tooth, 883, as shown. Hence, if the dial 702 is set for five decimal digits, the ear 859 would lie opposite the fifth such shoulder, as indicated by the dotted line 859-b.

The insertion of digital values into the multiplier carriage, through the linkage shown in FIGS. 14 and 11, is effective to rock the gear segment 843 in angular increments (counter-clockwise in FIG. 11) with each ordinal escapement of the multiplier carriage. Thus the coupling ear 859 moves (counter-clockwise from the position shown in FIG. 13) as each digital value is inserted into the multiplier register, and, after a total of ten such relative increments, will abut against a shoulder 889, which is half an increment removed from the last shoulder, or tooth, 883. In the assumed instance, there is a relative movement of five teeth due to the positioning of the segment 880 (to the position indicated at 859-b), so that after five whole digital values are inserted into the multiplier keys 65 and the multiplier carriage escapes five orders, the ear 859 would lie in opposition to the last notch 883. If, at this point, the decimal point key were operated, the coupling arm 851 would be moved by the means heretofore described to cause the ear 859 to engage in this last notch 883. If, on the other hand, an additional value were inserted without operation of the decimal point key, the ear 859 would move one additional increment as it is directly connected to the multiplier carriage. About half-way through this incremental movement, the ear 859 will engage the shoulder 889 and thereby rock the segment 880 against the force of its spring 886, moving this segment approximately half an increment in the process.

Associated with the segment 880 is a locking plate, or comb, 915 (FIGS. 12 and 19). This locking plate 915 is rotatably mounted on the sleeve 817 (FIGS. 17 and 19) immediately to the left, or outside, of the hub 881 of the segment 880. This locking plate likewise has a hub 917 of large diameter, preferably grooved to hold the spring 886 already described. As the locking plate 915 is rotatably mounted on the sleeve 817, it can be rotated independently of the sleeve and the lever 819 and also independently of the control segment. However, it is resiliently connected to the segment 880 by means of a tension spring 918 tensioned between a stud 919 on the segment 880 and a stud 920 on the comb plate 915. It follows that normally the locking plate 915 assumes an angular position corresponding to the angular position of the segment 880, the locking plate 915 being biased by its spring 918 against the stud 885 carried by the segment. Hence the rocking of the segment 880 half an increment, through the engagement of ear 859 with shoulder 889, is effective to rock the locking plate 915 a corresponding amount. The locking plate 915 is provided with a series of peripheral notches 916, equal to the number of ordinal positions of the multiplier carriage 372 (as shown in FIGS. 12 and 19).

Associated with the notches 916 of the locking segment 915 is a locking arm 925 (FIGS. 10 and 15) rigidly mounted on the extreme left end of the shaft 714. A spring 926 tensioned between the arm and the bracket 722 biases the arm and shaft 714 to the inoperative (counter-clockwise) position shown in these figures. A laterally projecting ear 927 is adapted to enter one of the notches 916 when the locking plate 915 is in one of its normal positions corresponding to the opposition of ear 859 (FIG. 13) with one of the notches 883 of the segment 880. However, when the segment 880 is rocked half an increment, thereby rocking the locking plate 915 a similar half increment, the ear 927 will abut the periphery of the locking plate 915 instead of entering one of the notches, thereby blocking rotation of the arm 925 and shaft 714 and hence the depression of the decimal point key 704. Thus the decimal point key cannot be operated when there are not enough ordinal positions left to take care of the full number of decimal digits required by the setting of dial 702.

G. *Operation*

The operation of our invention can best be understood by describing the operation of the machine with an assumed multiplier factor. For illustration, assume that the decimal digit dial 702 has been set to "5" to indicate that five decimal digits may be used in the multiplier factor. If four decimal places are also allowed for the multiplicand factor in the main keyboard, then a decimal point indicator 63 will be set between the ninth and tenth orders of the register dials 71 and products will be accumulated around that decimal point. Then any desired multiplicand factor can be set in the main keyboard around the decimal point marker 62 of the keyboard, as is conventional. Then, for exemplification, assume a multiplier factor of "12.375": the operator will insert the values "1" and "2" in sequence, then operate the decimal point key 704, and finally, the multiplier digit keys 65 for the values of "3", "7" and "5" in that sequence. At this point, the factor "12.375" would appear in the multiplier window 69, the decimal point marker 866 appearing between the "2" and the "3" to indicate the position of the decimal point in this factor.

The setting of the decimal digit dial 702 prior to the insertion of the multiplier value will have rotated the gear assembly of gear segment 816, collar 817 and two-armed lever 819 five increments (in a clockwise direction in FIGS. 11, 12 and 19). Simultaneously the control segment 880 and locking plate 915 will be rotated a like amount by spring 886. During the entry of the values of "1" and "2" the multiplier carriage 372 is shifted, or escaped, to the left in the conventional ordinal manner for a total of two ordinal steps. The ordinal movement of the multiplier carriage 372 two orders to the left as result of the insertion of the values of "1" and "2", moves the second gear assembly comprising the gear segment 843, the coupling arm 851 and the coupling segment 850 (counter-clockwise in these figures) through two steps. At this point, the operation of the decimal point key, through its rocking of shaft 714, coupling arm 752 (FIG. 22) and the decimal coupling pawl, or link, 891, will cause the one-step adjustment of the coupling segment 850 (clockwise in FIGS. 19 and 22). This operation moves the pin 854, which is affixed to this coupling segment from the detent notch in which it is located in FIG. 11 to the other, thereby detenting the coupling arm 851 in its inside position. Such movement of the arm moves the coupling ear 859 from the position shown in full lines in FIG. 13 to that shown by the dotted lines 859–a in which it is in engagement with one of the notches 883 of the segment 880. In this instance, of course, this takes place in the seventh such notch because the total relative rotation of the two elements has six steps from the first order position shown in full lines in FIG. 13 (five increments due to the clockwise rotation of the segment 880 from the positioning of arm 819 when the dial was initially set, and two more steps by the opposite rotation of gear segment 843 from the stepping of the multiplier carriage). Thereafter, the insertion of the decimal values "3", "7" and "5" cause three more incremental steps of the gear segment 843 (counter-clockwise in FIG. 11), thereby stepping the segment 880 three incremental steps in the same direction and against the tension of its spring 886. At this point the pin 885 carried by the segment 880 will be one incremental step removed from the arm 779 of the bellcrank assembly 777 and two incremental steps from effecting a rocking of this bellcrank.

If, at this point, one of the multiplier control keys 66, 67 or 68 is depressed, the shaft 439 will be rocked in the conventional manner (the locking arm 759 having been removed from its locking engagement shown in FIG. 20 to the position shown in FIG. 21 as result of the operation of the decimal point key, as heretofore explained). The rocking of this shaft in the conventional manner causes the engagement of the drive clutch and the closing of the motor switch, so that the machine is cycled. The rocking of this shaft has also caused the operation of the automatic carriage shifting mechanism described above so that the register carriage B is shifted to its extreme left-hand position. The operation of the override pawl, as was heretofore explained, rocks the shaft 532 (FIGS. 10 and 11), which, through the operation of arm 670 and link 671, forces the latch member 675 (counter-clockwise in these figures) to release the multiplier initiating arm 356. Normally, such rocking of the lever 356 would cause the enablement of the conventional multiplier program control lever 374 and the initiation of the multiplication operation. However, in the present instance, due to the fact that there are two decimal digits not used for the insertion of digital values, the register carriage B must be shifted two ordinal spaces to the right in order to properly align the decimal point in the product.

This is accomplished by means of the fact that the bellcrank assembly 777 (FIG. 20) has been resiliently rocked to the counter-clockwise position shown in this figure by the manipulation of the decimal point control key 700. The rocking of the bellcrank 777 through arm 790 rocks shaft 401 and, as shown in dotted lines in FIG. 9, rocks the blocking arm 400 into engagement with the pin 398 whereby the multiplier carriage shifting mechanism is disabled. Also the rocking of the bellcrank to the position shown in FIG. 20 has placed its blocking nose 775 under the ear 771 of arm 770, thereby blocking operation of shaft 377 and the conventional multiplier program control lever 373. Thus, the conventional operation of both the conventional segment feed pawl, not shown, and the multiplier carriage shifting pawl 393 is blocked, both of which blocking means will be held in blocking position until the carriage B has been shifted two ordinal steps. During this second of these ordinal shifting operations, the bellcrank assembly 787 will be rocked (clockwise in FIG. 20) to enable the conventional multiplier means, as will now be described.

The segment 880 is given additional incremental steps during the register carriage shifting cycles of operation in order to return it to its home position shown in FIGS. 10 and 15. This feed mechanism comprises an eccentric cam, not shown, on the left end of the main drive shaft 255 (FIGS. 10 and 15). This cam is embraced by a cam follower 935 which is held on the eccentric cam by a pair of side plates 936. A forwardly extending leg 937 carries a pin 938 at its forward, or free, end. This pin 938 is journalled in a bearing aperture in the upper end of an arm 939 which is pivotally mounted on the left-hand control plate 89 by a suitable stud 940. The pin 938 which interconnects the cam follower leg and the arm 939 lies within a substantially vertical slot 945 formed in the rear end of a feed pawl 946. The forward end of the feed pawl is provided with a slot 947 which embraces a pin 948 carried by the auxiliary mounting bracket 722. Thus the feed pawl 946 is reciprocated with each cycle of machine operation. The feed pawl, at its rear end, carries an ear 949 which is adapted to engage the teeth of the rack 882 on the lower portion of the control segment 880. The rear end of the feed pawl 946 is biased upwardly so as to enable engagement of the ear 949 with the teeth 882 by a suitable spring 950 tensioned between an ear 951 on the rear end of the pawl and a stud riveted to the auxiliary bracket 722.

While the feed pawl 946 is biased into engagement with the segment 880 by the spring 950, it is normally held out of such engagement by a holding pawl 955. This holding pawl is suitably journalled on a stud carried by the auxiliary bracket 722, such as by a pivot stud 960. The rear end of the pawl is provided with an ear 956 which overlies and engages the upper edge of the feed pawl 946 and also is adapted to engage the rack teeth 882 of the sector 880. Thus the ear 956 serves two purposes: It acts as a holding pawl, when the control sector 880 is fed by the feed pawl 946 and, when the holding pawl 955 is rocked counter-clockwise to the position shown in FIGS. 10 and 15, it forces the feed pawl 946 into the inoperative position shown. The holding pawl 955 is resiliently biased into engagement with the sector 880 by a suitable tension spring 957 tensioned between a stud 958 on the auxiliary bracket 722 and a seat formed in the forward end of the holding pawl 955. Normally, however, the feed pawl is held in the disengaged position shown in FIGS. 10 and 15 by the engagement of a roller 959 mounted on the forward end of the holding pawl 955, which roller engages the upper edge of the multiplier control arm 356. It will be recalled that this arm is latched in an upper and inoperative position, shown in FIG. 10, by means of the latch member 675 in all operations of the machine except during the actual multiplication operation. In multiplication operations, this lever is released by the operation of the override pawl, when the register carriage reaches its extreme left-hand position, so that until this time the feed pawl 946 and holding pawl 955 are held in the inoperative position shown in FIGS. 10 and 15. When the latch arm 675 is moved to its releasing position by the override mechanism and the control lever 356 drops to initiate a multiplication operation, the feed pawl and holding pawl become operative. If at this point the segment 880 has been returned to its "0," or home, position (as by the insertion of five decimal digits in the multiplier factor), the operation of the feed pawl is an idle one as the ear 949 lies in opposition to a blank space, or untoothed portion 879 behind the last tooth of the rack 882. In this position of the segment 880, the pin 885 will have rocked the bellcrank assembly 777 (FIG. 20), and multiplication can proceed in the conventional manner. If, on the other hand, less than the preselected number of decimal digits has been inserted in the multiplier factor (in the illustration used above in which three decimal digits were inserted while the dial 702 was set for "5"), the feed pawl 946 would engage the sector and move it through two increments during the two necessary shifting cycles. In the second of these cycles, the pin 885 will rock the bellcrank assembly 777 (clockwise in FIG. 20), and conventional multiplication will be initiated. Until that time, however, the original rocking of the bellcrank assembly 777 (counter-clockwise in FIG. 20) from the rocking of interponent 733 and the force of spring 780, disables the conventional multiplier program control arm 373. Also the original rocking of the bellcrank assembly 777 has rocked shaft 401 to disable the multiplier carriage feed pawl.

It is obvious, therefore, that as the operator sets the dial 702 to a predetermined position to provide a predetermined number of decimal digits in the multiplier factor, the control segment 880 is rotated (clockwise in FIGS. 10 and 15) to an adjusted position a corresponding number of increments away from the return rocking of the bellcrank assembly 777. The control segment 880 is thereafter returned a number of increments equivalent to the number of decimal digits inserted in the multiplier factor after it is coupled to the gear sector 843 by the operation of the decimal point key. Then, upon the initiation of a multiplication operation, and the return of the register carriage B to its home position, the control segment 880 is fed an additional number of increments necessary to complete the predetermined number of decimal digits in consecutive cycles of operation, during which the product register carriage is shifted a corresponding number of ordinal increments to the right.

H. *Restore* (FIGS. *10 and 11*)

The various mechanisms are restored to their normal positions at the end of a multiplication operation by means of a restore mechanism, shown particularly in FIGS. 10 and 11. The restore mechanism is operated by an eccentric cam 970 (FIG. 11) which is mounted on the main drive shaft 255. This cam is encompassed by a cam follower 971 with a rearwardly and downwardly extending tail 972. Preferably, this cam 970 is located immediately adjacent the feed pawl eccentric 935 and the innermost of the pair of guide plates 936. The tail 972 is biased upwardly by a suitable spring 973 tensioned between a stud 977 thereon and a stud 999 on the rear arm 998 of a bellcrank 997, as shown. The extreme end of the tail 972 is shaped as shown in FIGS. 10 and 11, and comprises an upper finger 974 which engages the stud 999 and a pair of shoulders 975 and 976. The shoulder 975 is adapted to engage a roller 349 on the upper arm of the multiplication initiating bellcrank 344 already mentioned, and the shoulder 976 is adapted to engage a pin 980 secured to the upper arm 981 of a bellcrank 982 which is pivoted on the stud 983 carried by the left-hand control plate 89. The lower arm 984 of the bellcrank 982 pivotally supports the rear end of a forwardly extending link 985, the forward end of which is supported by a pin-and-slot connection comprising the slot 986 in the link and a pin 987 carried by the arm 988. The arm 988 is rigidly mounted on the shaft 533, so that the rocking of the arm 988, from operation of link 985, rocks shaft 533 to release the conventional multiplication latches 534 and thereby enables the control keys 66, 67 or 68 to rise and terminate machine operation.

From the construction above-described it is obvious that the cam follower 971, 972 reciprocates in each cycle of operation. The spring 973 is so located that the major component of its force pulls the bellcrank 997 (counter-clockwise in FIG. 11) to the disabling position shown. Such positioning of the bellcrank 997 forces the tail 972 downwardly until the finger 974 engages the roller 349, which is the condition shown in FIG. 11. In this position, the tail 972 reciprocates idly, for neither shoulder 975 can engage its corresponding roller 349, nor shoulder 976 engage its corresponding stud 980.

The tail 972, however, is enabled to engage the two rollers, and therefore rock the bellcranks 344 and 982, during the overstroke cycle at the end of the multiplication operation. This is the cycle in which the multiplier carriage 372 is shifted one order to the right of its home position and immediately returns to the home position. This overstroke cycle is required in order to accomplish the resetting of the value pins in the multiplier carriage and to restore the multiplier segments to their "0" position. It will be recalled that the T-shaped gear segment 840 is connected to the carriage positioning lever 374 through link 826 (FIGS. 14 and 18), gear segments 830 and 838, and shaft 839. This T-shaped gear sector 840 is shown in the home position of the multiplier carriage in FIG. 11 and hence will be moved one additional increment (counter-clockwise in FIG. 11) during the overstroke cycle. It has already been mentioned that during this overstroke cycle the cam ear 844 on the forward end of the gear sector 840 will engage the ear 749 on latch 750 and thereby rock it to its releasing position. Simultaneously therewith, the left end of the gear sector 840 engages a stud 995 on the forwardly extending leg 996 of the bellcrank 997. The bellcrank 997 (FIG. 11) is pivotally mounted on the left-hand control plate 89 by any suitable means, such as stud 994, and is biased to the counter-clockwise position shown by the spring 973 tensioned between the stud 999 thereon and the stud 977 on the tail 972. The engagement of the end of the gear sector 840 with the pin 995, and the consequent rocking of the gear sector during the overstroke cycle, rocks the bellcrank 997 (clockwise in FIG. 11), thereupon rocking the tail 972 of the cam follower upwardly. At this point, the shoulders 975 and 976 engage their respective roller 349 and stud 980. The former rocks the bellcrank 344 and lever 356 to their inoperative positions in which the lever 356 is again latched by its latch 675. Simultaneously, the rocking of bellcrank 982 from engagement of shoulder 976 with stud 980 pulls the link 985 rearwardly, thereby releasing the latches which hold the operative multiplication key depressed. This key is, therefore, enabled to rise from the force of its spring (FIG. 10) and thereupon shaft 439 is permitted to return to its normal inoperative position and the machine comes to a complete stop.

I. Repeat Operation (FIGS. 10, 13, 15 and 18)

The mechanism of our invention is designed to cooperate with the repeat multiplier mechanism described in the patent to Plunkett et al., No. 2,824,695 of February 25, 1958, which mechanism is now conventional in the machine described in the Friden patents above-mentioned. As described in that patent, an arm (not shown in the present drawings) pivoted on stud 375 carries an arcuate rack which is locked in an adjusted position by the operation of the repeat key 1025. Cooperating with this rack is an arm on the lever 374 (FIG. 18) which controls the positioning of the multiplier carriage, so that the lever 374 can be rocked until blocked by the locked arcuate rack. As the multiplier carriage is returned to its home position, the escapement mechanism (not shown herein) is released, thereby permitting the multiplier carriage to escape to the left through the force of spring 376 acting upon the lever 374. This portion of the mechanism is not changed in the present invention.

In our invention, we add to the conventional mechanism shown in the Plunkett patent, a lever 1005 (FIGS. 10 and 15) which is pivotally mounted on a pivot stud 1006 carried by the bearing bracket 722 affixed to the left-hand control plate 89. The upper end of this bellcrank lever is provided with a slot 1007 which embraces the pin 795 carried by the repeat slide 1027. The lever 1005 is obviously rocked (clockwise in FIGS. 10 and 15) upon movement of the repeat lever from the normal inoperative position shown in these figures to its forward, or operative, position. A spring 1008 tensioned between the tail of this lever and a stud on the control plate 89 resiliently biases the lever to the inactive (counter-clockwise in these figures) position shown. The lever 1005 is affixed to a sleeve 1009, the left end of which carries an arm 1010. A pin 1011 on the lower extremity of this arm is embraced within a slot 1012 formed in the forward end of a locking pawl 1013. A spring 1014 tensioned between the pin 1011 and an ear 1015 on the forward end of the locking pawl 1013 resiliently biases the locking pawl 1013 to the retracted position shown.

The rear end of the locking pawl is supported in the machine by a pin-and-slot connection comprising a slot 1016 formed adjacent the rear end of the locking pawl 1013 and a pin 1017 riveted to the supporting bracket 722. An ear 1018 formed on the rearward end of the locking pawl 1013 is adapted to engage in the interdental spaces, or notches, 916 formed in the locking comb 915. Thus when the repeat key 1025 is moved to its forward, or operative, position, rocking the lever assembly 1005, 1010 (clockwise in FIGS. 10 and 15), the locking pawl 1013 is translated rearwardly, whereupon the ear 1018 enters into one of the notches 916 and locks the locking plate 915 against rotation.

It will be recalled that this locking plate normally follows the position of the segment 880 from the force of the spring 918 which connects this comb to the control segment 880. However, if the locking plate is locked in a set position, the control segment 880 can be shifted to its various positions against the tension of spring 918. However, in that event, when the operation is terminated and the parts are restored as heretofore described, the spring 918 will pull the control segment 880 to the position determined by the locking plate 915. This resets the automatic decimal mechanism in the same position as it was before. This resetting takes place simultaneously with the return of the multiplier carriage to the position determined by the conventional repeat mechanism, so that the machine can be operated an indefinite number of times using the same multiplier factor.

It will be understood that while the present invention has been shown and described as embodied in a machine of the type disclosed in the Friden and Plunkett patents above-mentioned, this invention is not limited to incorporation in such a machine but may be applied to other known machines. Manifestly, the arrangement shown is capable of considerable modification by a person skilled in the art without departing from the spirit and scope of our invention as described. Therefore, only such limitations should be imposed upon the present invention as are expressly indicated in the above specification, or expressly contained within the appended claims.

We claim:

1. In a calculating machine having multiplier value storage means, means for ordinally shifting said value storage means, a value entering means for entering values into said storage means, an escapement mechanism operable by said value entering means to control said shifting means for ordinal shift of said storage means with each digital entry including a "0," a product register, means for shifting said product register, a multiplication key, and means operated by said multiplication key for initiating a multiplication operation, the combination which comprises a decimal point key, means controlled by said decimal point key for conditioning said register shifting means for operation upon manipulation of said multiplication key, a manually settable indexing means for determining the number of ordinal shifts by said storage shifting means, and means operated by said indexing means following operation of said decimal point key for blocking operation of said value entering means upon completion of a predetermined number of ordinal shifts occurring subsequent to operation of the decimal point key.

2. In a calculating machine having multiplier value storage means, an escapement mechanism for shifting said value storage means, a value entering means for entering values into said storage means and to control operation of said escapement mechanism for an ordinal shift of said storage means with each digital entry including a "0," a product register, means for shifting said product register, a multiply key, and means operated by said multiply key for initiating a multiplication operation, the combination which comprises a first indexing means for representing the ordinal position of said storage means, a second indexing means settable to predetermine the number of decimal digits in said storage means, a means for fixing the relative position of said two indexing means, a decimal point key, means operated by said decimal point key for operating said fixing means, and means operated by said two indexing means when so fixed for operating said register shifting means a number of times equal to the difference between the value determined by said second indexing means and the number of operations of said escapement mechanism subsequent to the operation of the decimal point key and for blocking operation of said multiplication initiating means during such shifting operations.

3. In a calculating machine having a keyboard, a product register, means for shifting said register relative to said keyboard, a multiplier factor storage means, and selection means for entering the digits of a multiplier factor into said storage means, means for setting a representation of a decimal point for a multiplier factor into said storage means, means operated by said setting means to thereafter limit operation of the said selection means to the entry of a predetermined number of digits into the multiplier factor means, a multiplication initiating key, means controlled by said multiplication key upon operation thereof subsequent to the operation of said setting means to effect a right shift of said product register a number of increments equal to the difference between said predetermined number and the number of operations of said selection means subsequent to the operation of said setting means.

4. In a calculating machine, selection means for registering a multiplicand factor, a product register, actuating means for entering a value determined by said selection means into said register, means for shifting the relative ordinal positions of the actuating means and the register, a multiplier factor storage means means for entering the digits of a multiplier factor into said storage means, a multiplication initiating key, multiplying means normally controlled by said initiating key upon operation thereof to operate said actuating means and said shifting means to multiply a value set in said selection means by a value in said storage means, a first indexing means for representing the number of digital values in the said storage means, a second indexing means resiliently settable to predetermine the number of decimal digital values in the said storage means, a decimal point key operative to connect the two indexing means whereby the second is thereafter returned to a predetermined home position by movement of the first, means operated by the second indexing means when out of said predetermined home position for operating said shifting means and blocking operation of said multiplying means and when in its home position for operating said multiplying means upon the subsequent operation of the initiating key, and means operated during operation of said shifting means for incrementally moving said second indexing means toward its home position.

5. In a calculating machine having an accumulator and an actuating means therefor, means for ordinally shifting said accumulator relative to said actuating means, a multiplier mechanism including an ordinally positionable storage device, means for entering the digits of a multiplier factor into said storage device and for positioning said storage device simultaneously with the entry of a digital value thereinto, a multiplication control key, and multiplying means operated by said key for operating said actuating means and said shifting means for effecting a multiplication operation, a mechanism for effecting registration of a product in said accumulator at a predetermined decimal position comprising a decimal point key, a decimal indexing means representative of the number of decimal digits in a multiplier factor, a control member resiliently connected to said indexing means, an adjustable member representative of the ordinal position of said storage device, means operated by said decimal point key for connecting said adjustable member and said resiliently connected member for movement of the latter towards a "0" decimal position upon movement of said storage device, means operated by movement of said resiliently connected member from its "0" decimal position for conditioning said accumulator shifting means for continuous right shift operations upon manipulation of said multiplier control key, means operated simultaneously with operation of said shifting means for moving said resiliently connected member toward its "0" decimal position, and means operated by the return of said resiliently connected member to its "0" decimal position for terminating said shifting operation and initiating operation of said multiplying means.

6. In a calculating machine having a product register, a multiplicand value selection means, means for shifting said register relative to said multiplicand value indexing means, a multiplier value storage means, a multiplier value indexing means, an escapement mechanism operable by said multiplier value indexing means to ordinally shift said storage means one order with each operation of said indexing means, means for shifting said multiplier storage means in the opposite direction during a multiplication operation, a multiplier key for initiating a multiplication operation including means for operating said register shifting means to shift said register to a home position prior to the initiation of a multiplication operation, and means for controlling operation of said machine by the multiplier storage means, the combination which comprises a decimal point key, means operated by said decimal point key for conditioning said register shifting means for a right shifting operation following the return of the register to its home position and for disabling said means for shifting said multiplier storage means in the opposite direction upon the subsequent operation of said multiplier key, a multiplier position indexing means for resiliently determining the number of said right shift operations, and means operated by said escapement mechanism subsequent to operation of said decimal point key for adjusting said multiplier position indexing means to reduce the number of said right shift operations.

7. In a calculating machine having an ordinally arranged product register, an ordinally arranged value entering means for controlling the entry of values into said register, means for shifting the relative ordinal positions of the said register and the said value entering means, an ordinally arranged multiplier value indexing means, an escapement mechanism operable by said multiplier value indexing means to ordinally adjust the position of said indexing means, means for shifting said multiplier indexing means in the opposite direction during a multiplication operation, program means controlled by said indexing means for controlling operation of said value entering means and said shifting means for multiplying a value set in said value entering means by a multiplier value set in said indexing means, and a multiplier key for initiating a multiplication operation including means for first operating said shifting means in a direction to align the lowest orders of the register and the value entering means prior to the inititation of operation of said program means, the combination which comprises a decimal point key, means operated by said decimal point key for conditioning said shifting means for an operation in the reverse direction following the return to the aligned position and for disabling the program means upon the subsequent operation of said multiplier key, a control means for representing the ordinal position of the indexing means, a second control means settable to predetermine the number of decimal digits in said indexing means, and means jointly controlled by said two control means for terminating operation of said shifting means upon determination of a predetermined number of said shifting operations and for enabling operation of said program means.

8. In a calculating machine having a product register, a multiplying mechanism for controlling a multiplication operation of said machine including an ordinally adjustable multiplier storage means operable to receive a multiplier factor, a multiplier factor entering means, escapement means for ordinally adjusting said storage means upon operation of said factor entering means with the entry of each digit thereby, and a control key for initiating operation of said multiplying mechanism, a means for effecting the accumulation of products around a predetermined decimal point in said register comprising means settable to determine the number of decimal digits in the multiplier factor, a detent means for said settable determining means, a decimal point key, a member for blocking escapement of said multiplier storage means resiliently moved from a home postion by said settable determining means, means operated by said decimal point key for operatively locking said blocking member to said multiplier storage means whereby the blocking means is incrementally moved towards its home position upon each ordinal escapement of said multiplier carriage, and means operated by return of said blocking means to its home position for blocking operation of said escapement means.

9. In a calculating machine having a product register, means for shifting said register, a multiplying mechanism for controlling the registration of a product in said register including an ordinally shiftable multiplier storage means operable to receive a multiplier factor, a multiplier factor entering means, escapement means for ordinally shifting said storage means upon operation of said factor entering means with the entry of each digit thereby, and a multiply control key, a means for effecting the accumulation of products around a predetermined decimal point in said register comprising means settable to control the number of decimal digits in the multiplier factor, a decimal point key, a member for blocking escapement of said multiplier storage means resiliently moved from a blocking position by said settable control mean, means operated by said decimal point key for operatively locking said blocking member to said multiplier storage means whereby the blocking means is incrementally moved towards its blocking position upon each ordinal escapement of said multiplier carriage, means operated by the decimal point key for connecting said adjustable member to said blocking member, means operated by said control key for operating said register shifting means and simultaneously returning said blocking means towards its blocking position, and means operated by return of said blocking means to its blocking position for blocking operation of said escapement means and for terminating the operation of the shifting means and for initiating operation of said multiplying mechanism.

10. In a calculating machine having a product register; means for shifting said register in either direction; a multiplying mechanism for controlling the registration of a product in said register including a shiftable multiplier carriage, a multiplier factor keyboard, escapement means for shifting said carriage upon operation of the keys of said keyboard, and control means operable to control operation of said multipling mechanism; and a control key for initiating a multiplication operation including first shifting the register to a predetermined home position and thereafter initiating operation of said multiplying mechanism: means for effecting the accumulation of a product around a predetermined decimal point in said register comprising means settable to indicate a predetermined number of decimal digits in the multiplier factor, a decimal point key, a stopping member resiliently positioned from a home position by said settable indicating means, means operated by said decimal point key for conditioning said register shifting means for a right shift operation upon operation of said multiply control key, means for connecting said register shifting means during said right shift operations to said stopping means whereby each ordinal right shift of the register returns said stopping means one increment towards its home position, and means operated by return of said stopping means to its home position for terminating said right shift operation and for initiating operation of said multiplying mechanism.

11. In a calculating machine having a product register, means for shifting said register in either direction, a multiplying mechanism for controlling the registration of a product in said register including a shiftable multiplier carriage, a multiplier factor keyboard, escapement means means for shifting said carriage upon operation of the keys of said keyboard, control means operable to control operation of said multiplying mechanism, and a control key for initiating a multiplication operation including first shifting the register to a predetermined home position and thereafter initiating operation of said multiplying mechanism, means for effecting the accumulation of a product around a predetermined decimal point in said register comprising means settable to indicate a predetermined number of decimal digits in the multiplier factor, a decimal point key, a stopping member resiliently positioned from a home position by said settable indicating means, means operated by said decimal point key for connecting said stopping member to said multiplier carriage whereby the stopping member is incrementally moved towards its blocking position upon each oridnal escapement of said multiplier carriage, and means operated by return of said stopping member to its home position for blocking operation of said escapement means, means operated by said decimal point key for conditioning said register shifting means for a right shift operation upon operation of said multiply control key, means for connecting said register during said right shift operations to said stopping means whereby each ordinal right shift of the register returns said stopping means one increment towards its home position, and means operated by return of said stopping means to its home position for terminating said right shift operation and for initiating operation of said multiplying means.

12. In a calculating machine having a product register, means for shifting said register, a multiplicand selection means, a register driving means controlled by said selection means for operating said register, a multiplying mechanism for controlling the registration of a product in said register including a shiftable multiplier carriage and carriage borne multiplier storage elements operable to receive a multiplier factor, a multipler factor entering means, escapement means for shifting said carriage upon an operation of said factor entering means, operating means controlled by said carriage borne elements in each shifted position thereof to control operation of said register driving means and an operation of said shifting means for a single order right shift operation, and a control key for initiating operation of said multiplying mechanism including first shifting the register to a predetermined home position and thereafter initiating operation of said operating means under the control of said carriage borne elements, means for effecting the accumulation of a product around a predetermined decimal point in said register comprising means settable to indicate an invariable decimal position in each multiplier factor, a detent means for said indicating means, a decimal point key, means for blocking escapement of said multiplier carriage resiliently positioned from a blocking position by said settable indicating means, means operated by said decimal point key for operatively locking said blocking means to said multiplier carriage whereby the blocking means is incrementally moved towards its blocking position upon each ordinal escapement of said multiplier carriage, and means operated by return of said blocking means to its blocking position for blocking operation of said escapement means, means operated by said settable means for conditioning said register shifting means for a right shift operation upon operation of said multiply control key and the normal shifting of said register to its home position, means operated by said settable means for disabling said multiplier carriage shifting means and said operating means, means for returning said blocking means one increment toward its blocking position during each of said right shift operations, and means operated by return of said blocking means to its blocking position for terminating said right shift operation and for initiating operation of said operating means.

13. In a calculating machine having an accumulator and an actuating means therefor, means for ordinally shifting said accumulator to the right relative to said actuating means, a multiplier selection mechanism including a normally inoperatively positioned carriage, a plurality of ordinally arranged carriage borne selection elements normally representing "0", means for adjusting said elements to represent the digits of a multiplier factor, means for moving said carriage from the inoperative to an operative ordinal position simultaneously with the adjustment of an element to represent a digital value, means for shifting said carriage in the opposite direction, means for restoring the element in the operative ordinal position to "0" representing position when displaced therefrom, an operational control key for initiating operation of said restoring means, and multiplying means controlled by the element in the operative ordinal position of said carriage for effecting simultaneous operation of said actuating means and of said restoring means and upon the restoration of that element to "0" to control operation of said accumulator shifting means to shift the accumulator to the right and said carriage shifting means to shift said carriage in its opposite direction, a tabulating control mechanism for said accumulator comprising a decimal point key, a decimal indexing means representative of the number of decimal digits in a multiplier factor, a control member resiliently connected to said indexing means, an adjustable member representative of said carriage position, means operated by said decimal point key for connecting said adjustable member and said resiliently connected member for movement of the latter towards a "0" decimal position upon further moving of said carriage, means operated by the return of said resiliently connected member to its "0" decimal position for blocking operation of said carriage, a multiplier initiating key, means operated by said decimal point key for conditioning said accumulator shifting means for continuous right shift operation upon manipulation of said multiplier control key and for disabling said carriage shifting means, and means operated by the return of said resiliently connected member to its "0" decimal position for terminating said shifting operation and initiating operation of said multiplying means.

14. The apparatus of claim 13 comprising also a decimal point indicating means adjacent each selection element and means operated by said decimal point key for adjusting said decimal point marker to an indicating position.

15. In a calculating machine having an ordinally arranged product register, a selection mechanism, means for adjusting the relative ordinal positions of said selection mechanism and said product register, an ordinally arranged multiplier value storage means, a value entering means for entering values into said storage means, means for ordinally shifting said storage means operated by said value entering means, program means for ordinally controlling operation of said register and said adjusting means by sequential orders of said value storage means, a multiplication key, and means operated by said multiplication key for initiating a multiplication operation, the combination which comprises a decimal point key, means controlled by said decimal point key for conditioning said adjusting means for operation upon manipulation of said multiplication key, a first indexing means movable in one direction to represent the ordinal position of said storage means, a second indexing means settable in the other direction from a home position to represent a preselected number of decimal digits, means operated by said decimal point key for connecting said indexing means whereby the second indexing means will be returned toward its home position by subsequent operation of the first indexing means, means operated by said adjusting means for returning said second indexing means toward its home position, and means operated by return to its home position by said second indexing means for terminating operation of said adjusting means and operating said initiating means.

16. In a calculating machine, selection means for registering a multiplicand factor, a product register, actuating means for entering a value determined by said selection means into said register, means for shifting the relative ordinal positions of the actuating means and the register, a multiplier factor storage means, means for entering the digits of a multiplier factor into said storage means, a multiplication initiating key, multiplying means normally controlled by said initiating key upon operation thereof to operate said actuating means and said shifting means to multiply a value set in said selection means by a value in said storage means, a first indexing means settable in one direction for representing the number of digital values in the said storage means, a second indexing means resiliently settable in the reverse direction from a home position to predetermine the number of decimal digital values in the said storage means, a decimal point key operative to connect the two indexing means whereby the second is thereafter positioned by the first, means operated by the second indexing means when out of said home position and connected to said first indexing means for operating said shifting means and blocking operation of said multiplying means and when in its home position for enabling operation of said multiplying means, and means operated simultaneously with operation of said shifting means for incrementally moving said second indexing means toward its home position when connected to said first indexing means.

17. In a calculating machine having multiplier value storage means, an escapement mechanism for shifting said value storage means, a value entering means for entering values into said storage means and to control operation of said escapement mechanism for an ordinal shift of said storage means with each digital entry including a "0", a product register, means for shifting said product register, a multiply key, and means operated by said multiply key for initiating a multiplication operation, the combination which comprises a first indexing means for representing the ordinal position of said storage means, a second indexing means settable from a home position to predetermine the number of decimal digits in said storage means, a means for connecting the said two indexing means whereby operation of the first will return the second toward the home position, a decimal point key, means operated by said decimal point key for operating said connecting means, means controlled by said second indexing means for conditioning said register shifting means for operation upon operation of said multiply key, means operated by said register shifting means for returning said second indexing means to its home position, and means operated by the return of said second indexing means to its home position for terminating operation of said register shifting means and enabling operation of said multiplication initiating means.

18. In a calculating machine having a product register, means for shifting said product register, a multiplier value storage means, means for ordinally shifting said value storage means, a value entering means for entering values into said storage means, an escapement mechanism operable by said value entering means to control said shifting means for ordinal shift of said storage means with each digital entry, a multiplication key, and means operated by said multiplication key for initiating a multiplication operation, the combination which comprises a decimal control key, means controlled by said decimal control key for conditioning said register shifting means for operation upon manipulation of said multiplication key, a first indexing means for determining the number of ordinal shifts by said storage shifting means subsequent to operation of said decimal control key, a second indexing means representing the ordinal position of said storage means, and means operated jointly by said two indexing means following operation of said decimal control key for terminating operation of said register shifting means and operating said initiating means.

19. In a calculating machine having a product register, a selection means, a register actuating means, a multiplier mechanism for controlling a multiplication operation of said machine including an ordinally operable multiplier storage means for receiving a multiplier factor and a multiplier factor entering means, program means for controlling operation of said actuating means ordinally by said storage means, and a control key for initiating operation of said multiplier mechanism, a means for effecting the accumulation of products around a predetermined decimal point in said register comprising means settable to control the number of decimal digits in the multiplier factor, a decimal point key, a member for blocking operation of said program means resiliently moved from a home position by said settable control means, means operated by said decimal point key for operatively locking said blocking member to said multiplier storage means whereby the blocking means is incrementally moved toward its home position upon each operation of said factor entering means, and means operated by return of said blocking means to its home position for enabling operation of said program means.

References Cited in the file of this patent

UNITED STATES PATENTS

| | | |
|---|---|---|
| 2,291,133 | Avery | July 28, 1942 |
| 2,868,453 | Ellerbeck | Jan. 13, 1959 |
| 2,868,454 | Rutland et al. | Jan. 13, 1959 |

UNITED STATES PATENT OFFICE
CERTIFICATE OF CORRECTION

Patent No. 3,066,864                                                                    December 4, 1962

Arthur J. Malavazos et al.

It is hereby certified that error appears in the above numbered patent requiring correction and that the said Letters Patent should read as corrected below.

Column 7, line 58, for "xeroizing" read -- zeroizing --; column 8, line 21, for "mechine" read -- machine --; column 12, line 40, for "powder" read -- power --; column 21, line 61, for "337" read -- 373 --; column 22, line 51, for "in" read -- In --; column 23, line 16, after "clockwise" strike out the parenthesis; line 59, for "FIGS," read -- FIGS. --; column 26, line 49, after "18" insert a closing parenthesis; column 27, line 54, after "into" insert -- the --; column 32, line 3, for "and" read -- as --; line 36, for "engageing" read -- engaging --; column 36, line 21, after "has" insert -- been --; line 56, for "374" read -- 373 --; column 41, line 51, after "means", first occurrence, insert a comma; column 42, line 52, for "determing" read -- determining --; column 43, line 53, for "mean" read -- means --; column 44, line 26, strike out "means".

Signed and sealed this 16th day of July 1963.

(SEAL)
Attest:

ERNEST W. SWIDER                                                        DAVID L. LADD

Attesting Officer                                                            Commissioner of Patents